(12) United States Patent
Nakade

(10) Patent No.: US 9,889,849 B2
(45) Date of Patent: Feb. 13, 2018

(54) VEHICLE SPEED LIMITING SYSTEM

(71) Applicant: TOYOTA JIDOSHA KABUSHIKI KAISHA, Toyota-shi, Aichi-ken (JP)

(72) Inventor: Yusuke Nakade, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/156,987

(22) Filed: May 17, 2016

(65) Prior Publication Data

US 2016/0368494 A1   Dec. 22, 2016

(30) Foreign Application Priority Data

Jun. 16, 2015  (JP) ................................ 2015-121334

(51) Int. Cl.
| | |
|---|---|
| *B60T 8/32* | (2006.01) |
| *B60W 30/14* | (2006.01) |
| *B60W 50/10* | (2012.01) |
| *B60K 35/00* | (2006.01) |
| *B60W 50/00* | (2006.01) |
| *B60W 50/14* | (2012.01) |

(52) U.S. Cl.
CPC .......... *B60W 30/146* (2013.01); *B60K 35/00* (2013.01); *B60W 50/10* (2013.01); *B60K 2350/1004* (2013.01); *B60W 2050/0067* (2013.01); *B60W 2050/146* (2013.01); *B60W 2550/22* (2013.01); *B60W 2550/402* (2013.01); *B60W 2720/103* (2013.01)

(58) Field of Classification Search
CPC .... B60W 30/146; B60W 35/00; B60W 50/10; B60W 2350/1004; B60W 2050/0067; B60W 2050/146; B60W 2550/22; B60W 2550/402; B60W 2720/103
USPC .................................................... 701/93, 400
See application file for complete search history.

(56) References Cited

U.S. PATENT DOCUMENTS

| | | | | |
|---|---|---|---|---|
| 2003/0116416 A1* | 6/2003 | Wieltsch | ............. | B60Q 1/1469 200/61.27 |
| 2006/0136114 A1* | 6/2006 | Pettersson | ........... | F02D 41/0087 701/104 |
| 2006/0229792 A1* | 10/2006 | Kawazoe | ............. | B60W 30/16 701/93 |

(Continued)

FOREIGN PATENT DOCUMENTS

| | | |
|---|---|---|
| DE | 102013205609 A1 | 10/2014 |
| JP | 2005-128790 A | 5/2005 |

(Continued)

*Primary Examiner* — Shardul D Patel
(74) *Attorney, Agent, or Firm* — Oliff PLC

(57) ABSTRACT

A speed limit value that is set for a road where a vehicle is travelling is used to limit a driving force of the vehicle. If a new speed limit value is acquired, which differs from a currently used speed limit value, and the vehicle is in a state where the driving force is limited based on the currently used speed limit value, a switching screen page enabling an occupant of the vehicle to input a switching instruction to switch the speed limit value used to limit the driving force is displayed. Then, if the occupant inputs the switching instruction in response to the switching screen page being displayed, the speed limit value used to limit the driving force is switched to the new speed limit value.

9 Claims, 20 Drawing Sheets

(56) References Cited

U.S. PATENT DOCUMENTS

| | | | |
|---|---|---|---|
| 2008/0189021 A1* | 8/2008 | Inoue | B60K 31/047 |
| | | | 701/93 |
| 2010/0204896 A1* | 8/2010 | Biondo | B60W 30/143 |
| | | | 701/93 |
| 2011/0160978 A1* | 6/2011 | Yuzawa | B60W 10/06 |
| | | | 701/93 |
| 2012/0253628 A1* | 10/2012 | Maruyama | B60W 50/085 |
| | | | 701/93 |

FOREIGN PATENT DOCUMENTS

| | | | |
|---|---|---|---|
| JP | 2006-168593 A | 6/2006 |
| JP | 2009-035223 A | 2/2009 |
| JP | 2009-208661 A | 9/2009 |
| JP | 2010-077960 A | 4/2010 |
| JP | 2012-206594 A | 10/2012 |
| JP | 2014-221601 A | 11/2014 |
| WO | 2010/023998 A1 | 3/2010 |

* cited by examiner

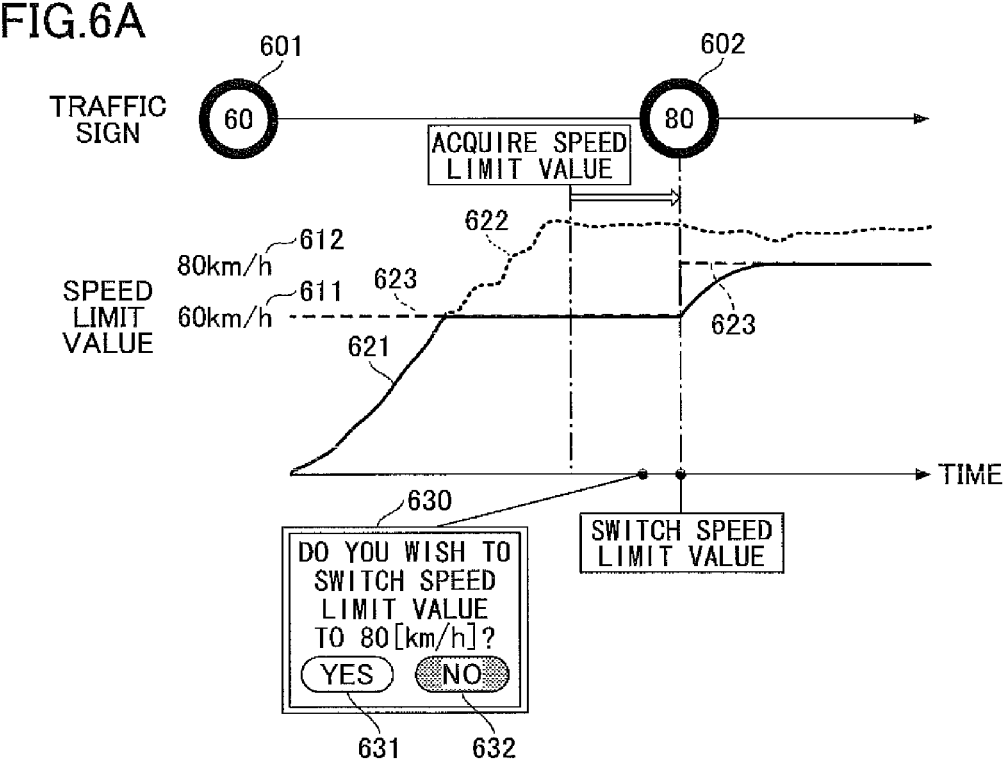
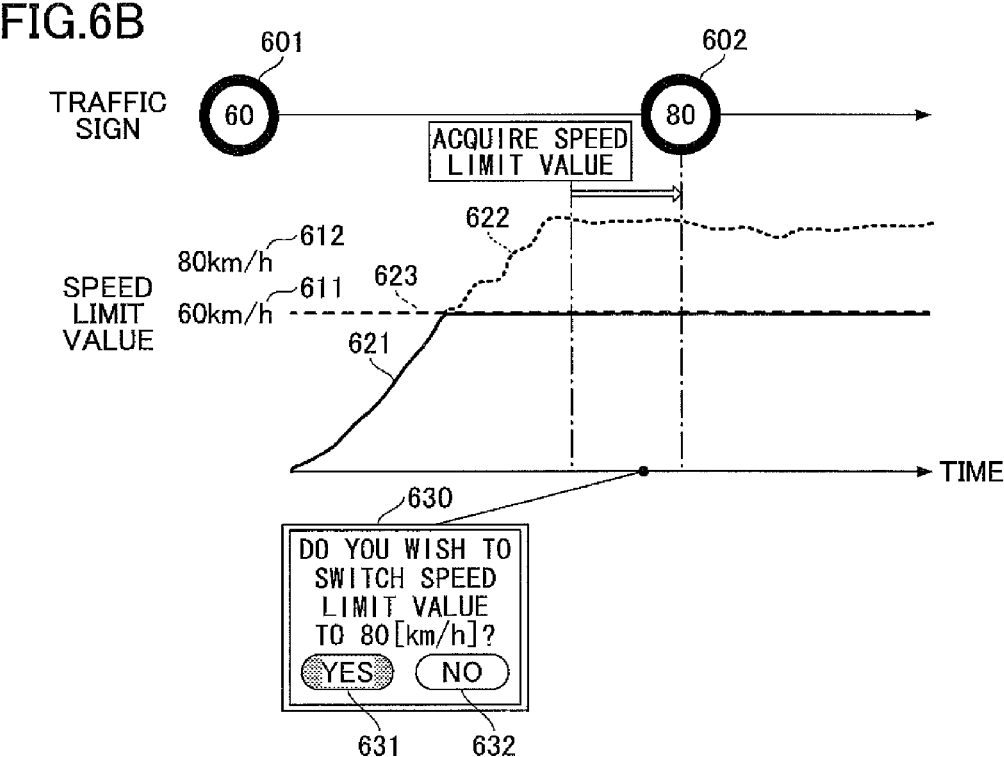

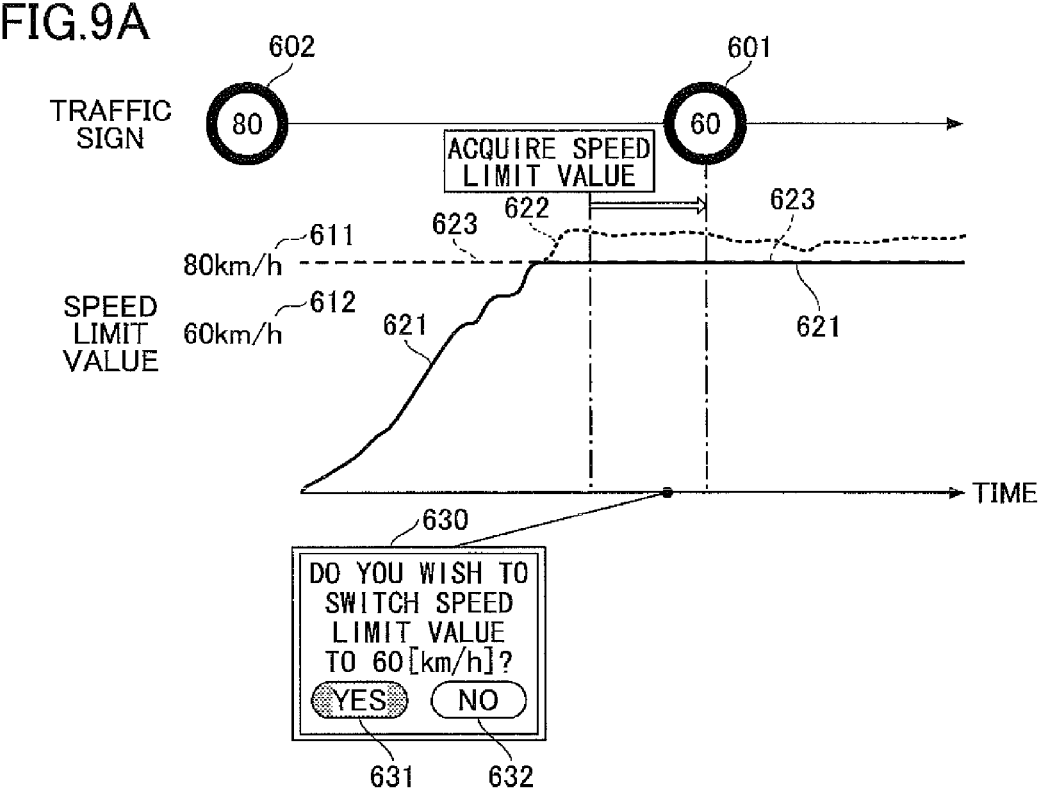
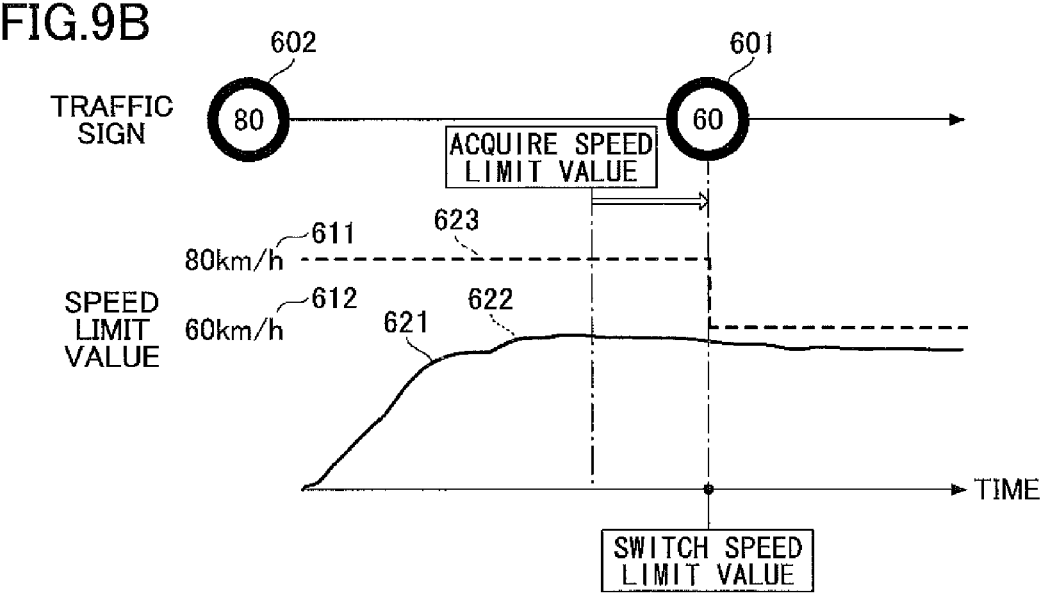

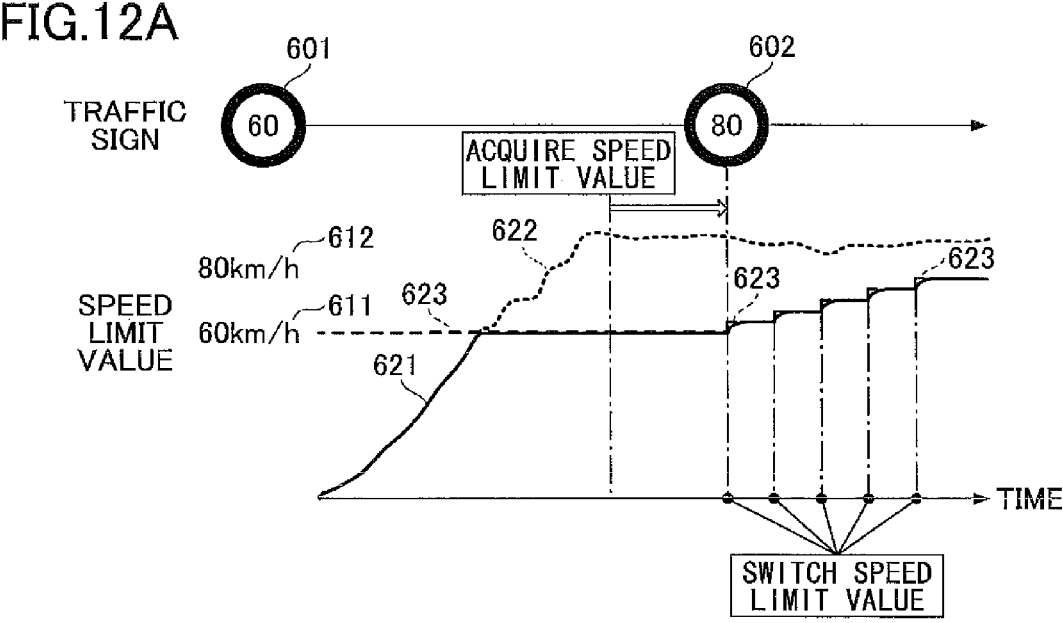
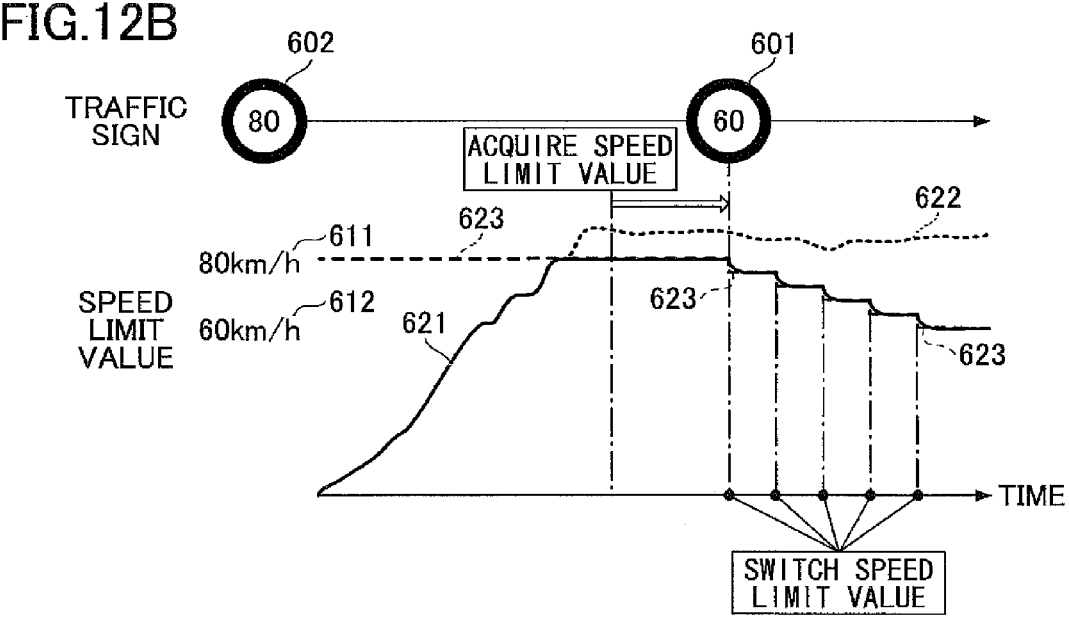

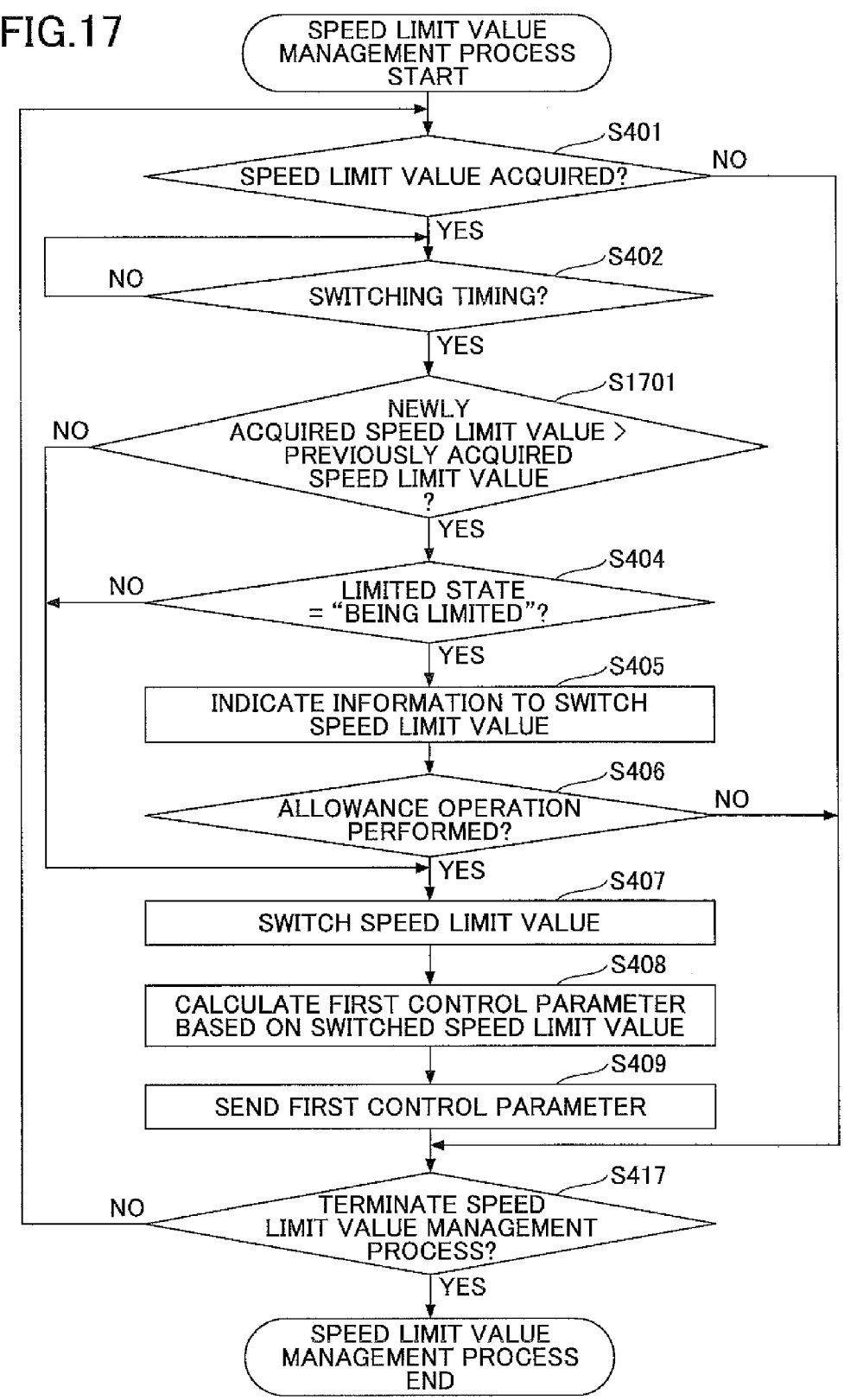

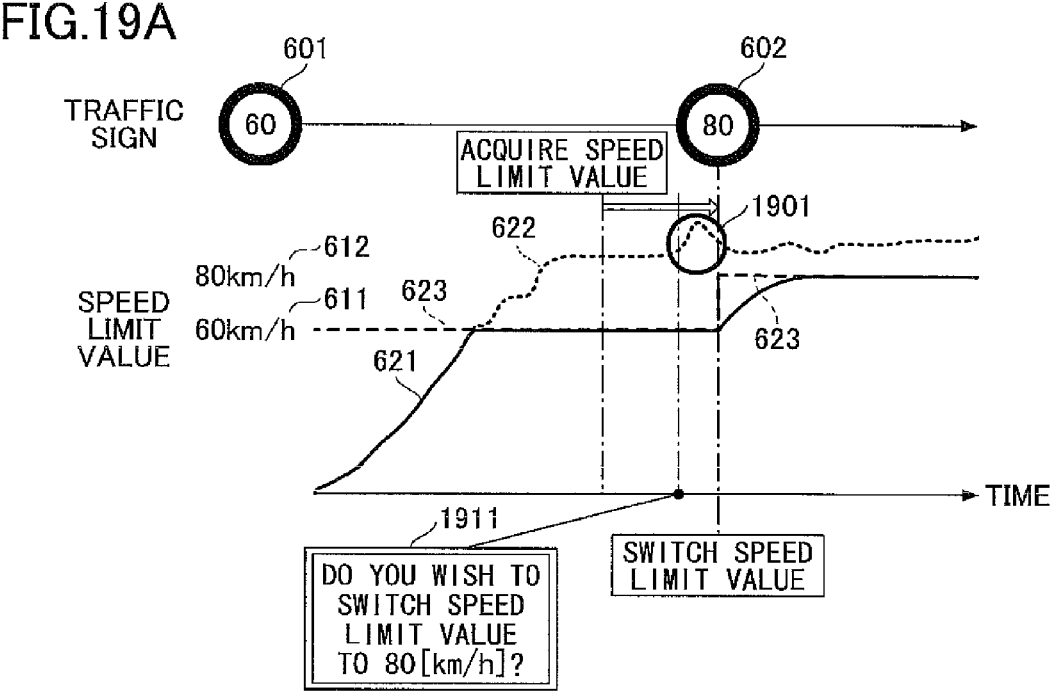
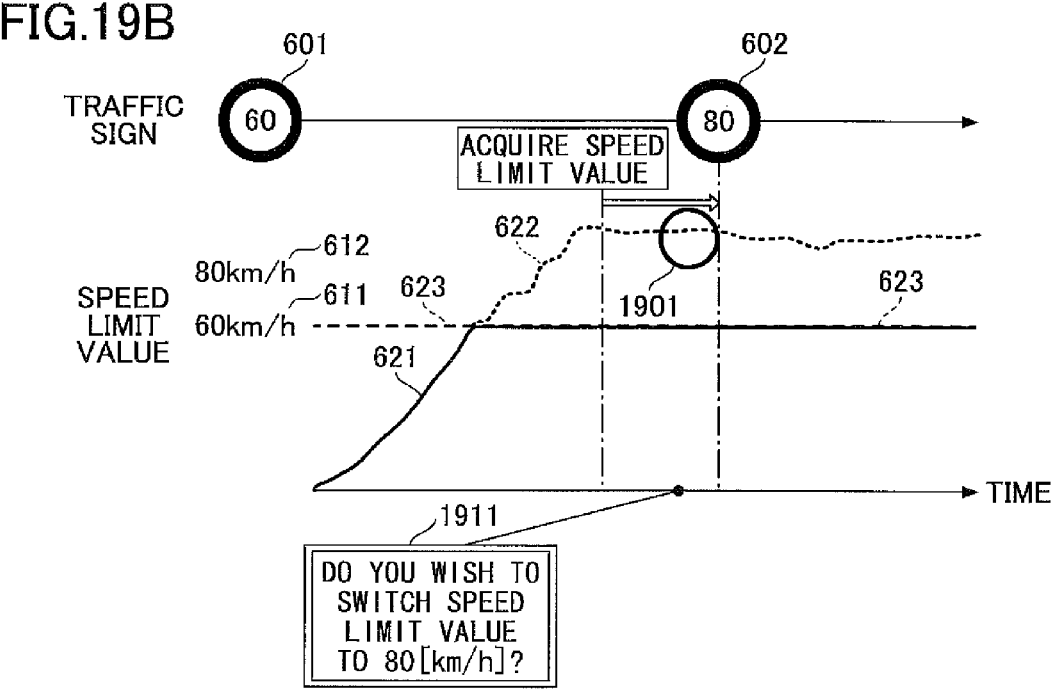

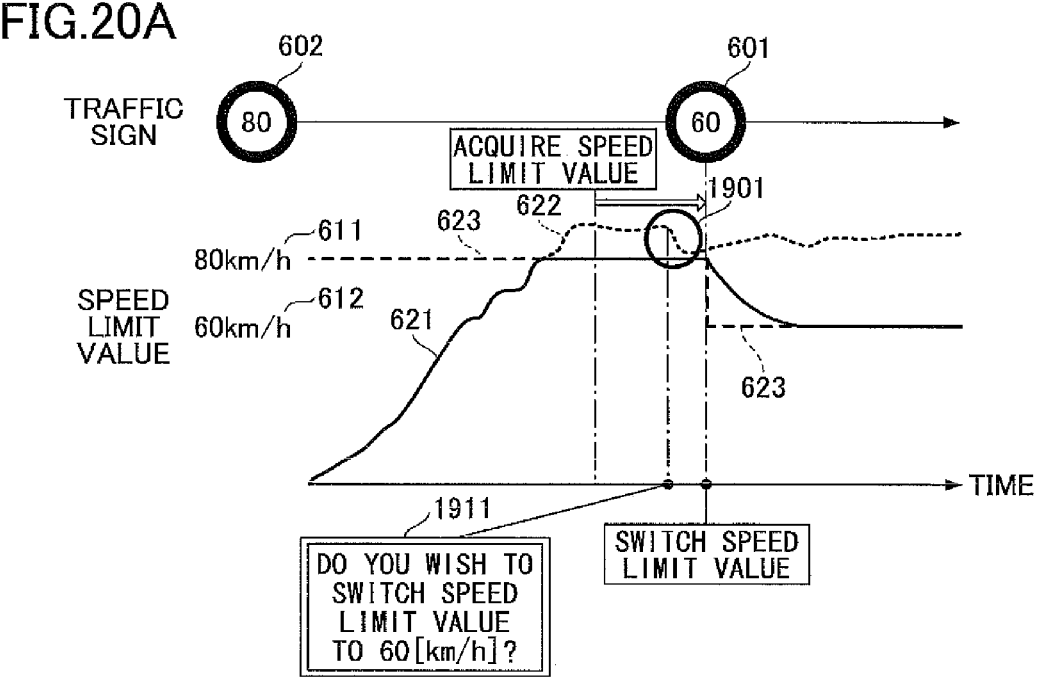
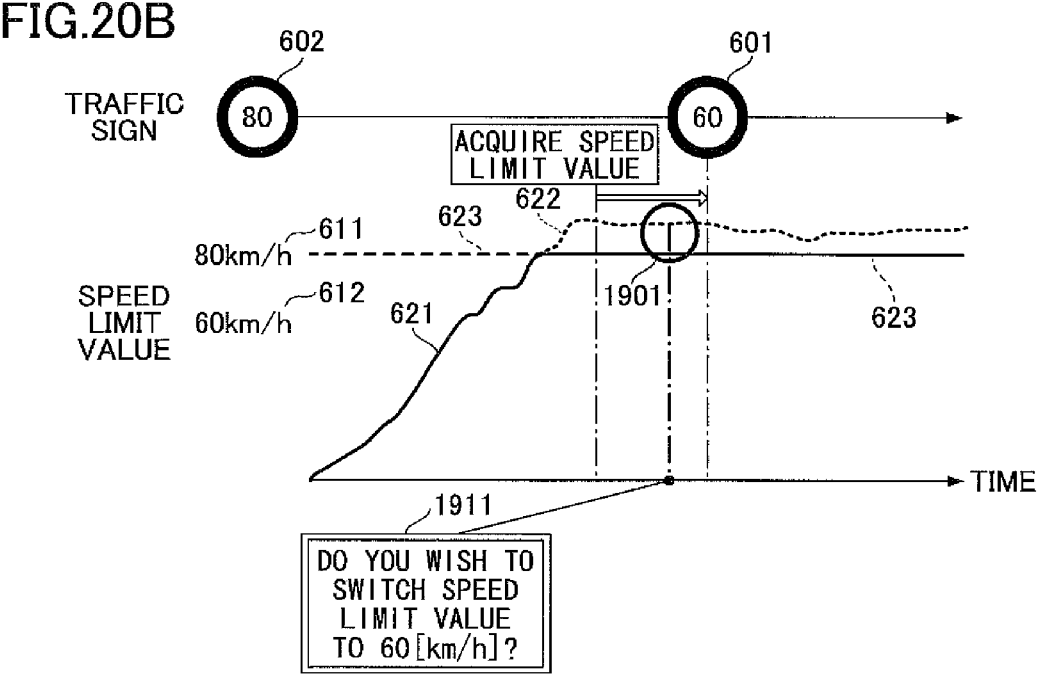

VEHICLE SPEED LIMITING SYSTEM

The present application is based on and claims the benefit of priority of Japanese Priority Application No. 2015-121334, filed on Jun. 16, 2015, the entire contents of which are hereby incorporated herein by reference.

BACKGROUND

1. Technical Field

The present disclosure relates to a vehicle speed limiting system.

2. Description of the Related Art

In the related art, a vehicle speed limiting system is known which detects a traffic sign or the like, thus acquires a speed limit value that is set for a road or the like, and limits the driving force of a vehicle based on the thus acquired speed limit value. According to the vehicle speed limiting system, even if the driver treads (presses) on the accelerator pedal with a treading (pressing) amount as to exceed the speed limit value, the driving force of the vehicle is limited based on the speed limit value. Thus, the vehicle speed can be limited (for example, see Japanese Laid-Open Patent Application No. 2006-168593).

SUMMARY

According to one aspect, a vehicle speed limiting system that controls a vehicle includes one or more processors configured to acquire a speed limit value that is set for a road where the vehicle is travelling; limit a driving force of the vehicle based on the acquired speed limit value; determine whether the vehicle is in a state where the driving force is being limited; display a switching screen page enabling an occupant of the vehicle to input a switching instruction to switch the speed limit value used to limit the driving force when (i) a new speed limit value, different from a current speed limit value that was previously acquired, is acquired, and (ii) it is determined that the vehicle is in the state where the driving force is being limited; and switch the speed limit value that is used to limit the driving force to the new speed limit value when the occupant of the vehicle inputs the switching instruction in response to the display of the switching screen page.

Other objects, features and advantages will become more apparent from the following detailed description when read in conjunction with the accompanying drawings.

BRIEF DESCRIPTION OF THE DRAWINGS

FIGS. 6A and 6B illustrate actual examples of the speed limit value management process and the speed limiting process;

FIGS. 9A and 9B illustrate actual examples of the speed limit value management process and the speed limiting process;

FIGS. 12A and 12B illustrate actual examples of the speed limit value management process and the speed limiting process;

FIG. 17 is a flowchart illustrating one example of the speed limit value management process;

FIGS. 19A and 19B illustrate actual examples of the speed limit value management process and the speed limiting process; and FIGS. 20A and 20B illustrate actual examples of the speed limit value management process and the speed limiting process.

DETAILED DESCRIPTION OF EMBODIMENTS

Figure 1:
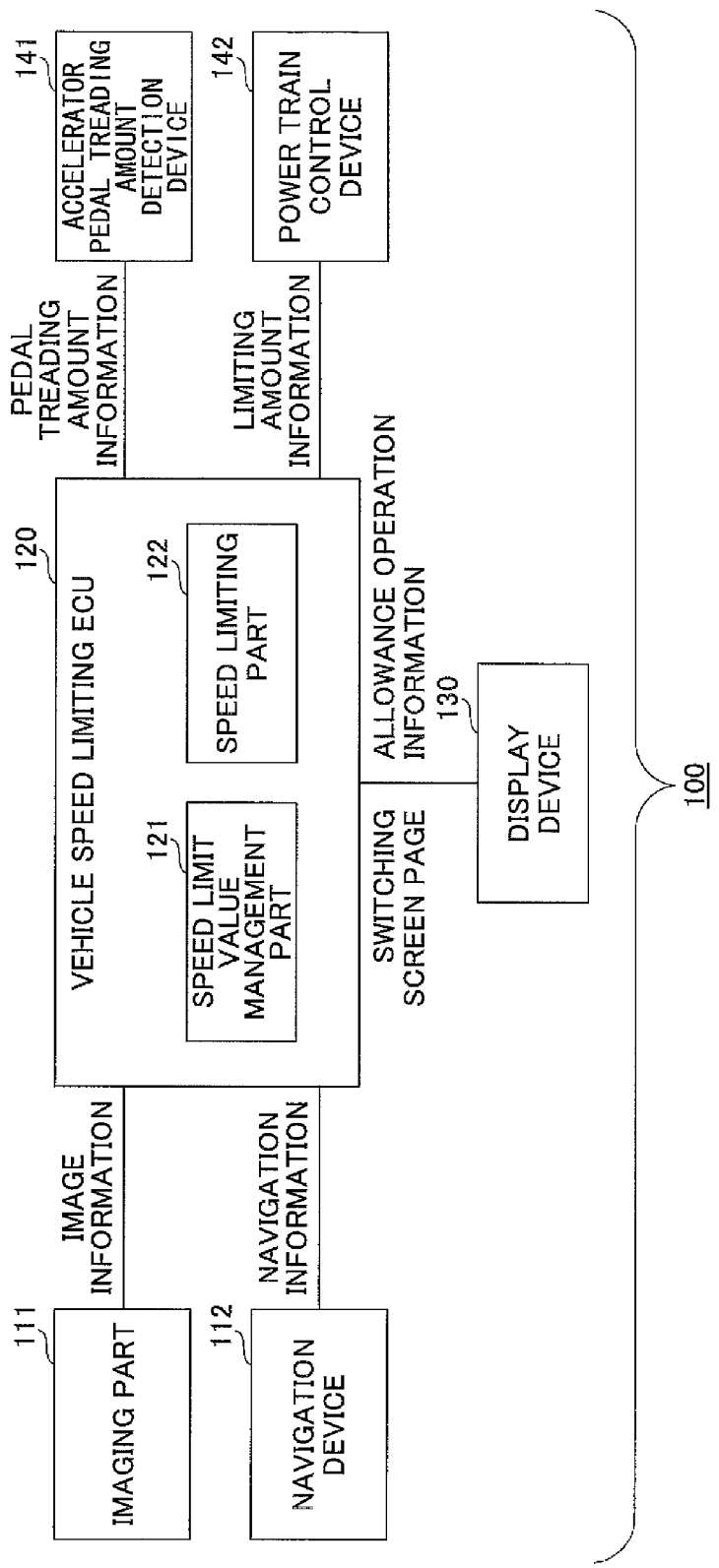
FIG. 1 illustrates one example of a vehicle speed limiting system.

For the purpose of convenience, the description of the above-mentioned related art will be continued first.

In the above-described vehicle speed limiting system in the related art, the speed limit value is automatically switched if, for example, a next traffic sign is detected under a state where the driving force of the vehicle is limited based on the speed limit value that is set for the road. As a result, a variation in the vehicle speed occurs due to the automatic switching of the speed limit value. Such a variation in the vehicle speed is different from one caused in response to the driver himself or herself changing the treading amount (pressing amount) on the accelerator pedal. Therefore, the driver may have a feeling that something is wrong.

In this regard, if the driver can know of a variation in the vehicle speed caused by the automatic switching of the speed limit value before the variation in the vehicle speed actually occurs, and the automatic switching is carried out in response to an instruction given by an occupant such as the driver, the driver's feeling that something is wrong can be reduced.

Thus, the present disclosure has an object to, in a vehicle speed limiting system, reduce a feeling of the driver of the vehicle that something is wrong arising when a variation in the vehicle speed occurs due to automatic switching of the speed limit value, by previously causing the driver to know about the automatic switching of the speed limit value resulting in a variation in the vehicle speed and causing the automatic switching to be carried out in response to an instruction given by an occupant of the vehicle.

According to one aspect, a vehicle speed limiting system includes one or more processors configured to carry out acquiring of a speed limit value that is set for a road where a vehicle is travelling; limiting a driving force of the vehicle based on the speed limit value acquired by the acquiring; determining whether the vehicle is in a state where the driving force is limited by the limiting; displaying a switching screen page for inputting a switching instruction to switch the speed limit value used by the limiting to limit the driving force if the acquiring newly acquires a new speed limit value different from a current speed limit value and the determining determines that the vehicle is in a state where the driving force is limited; and switching the speed limit value to the newly acquired new speed limit value to be used by the limiting to limit the speed limit value if an occupant of the vehicle inputs the switching instruction in response to the displaying of the switching screen page.

In the vehicle speed limiting system, if the new speed limit value is acquired, the determining determines whether the vehicle is in a state where the driving force is limited. If the determining determines that the vehicle is in a state where the driving force is limited, the displaying displays the switching screen page for inputting a switching instruction to switch the speed limit value. Then, if the occupant of the vehicle inputs the switching instruction in response to the switching screen page being displayed, the speed limit value is switched to the newly acquired speed limit value to be used to limit the driving force.

Therefore, under a state where the driving force of the vehicle is limited, no switching occurs to the newly acquired speed limit value even if the new speed limit value is acquired unless the occupant inputs the switching instruction. In other words, the driver of the vehicle can previously know about a variation in the vehicle speed to occur due to automatic switching to the newly acquired speed limit value before the switching occurs.

As a result, it is possible to reduce occurrence of the driver's feeling that something is wrong when a variation in the vehicle speed occurs due to automatic switching of the speed limit value.

Thus, in the vehicle speed limiting system according to the present disclosure, a variation in the vehicle speed caused by automatic switching of the speed limit value is known by the driver before the automatic switching occurs, and the automatic switching is actually carried out in response to the occupant's instruction. Thereby, it is possible to reduce occurrence of the driver's feeling that something is wrong when a variation in the vehicle speed occurs due to automatic switching of the speed limit value.

Below, embodiments will be described using the accompanying drawings. Note that in the descriptions and the drawings, the same reference numerals are used for the elements having the substantially same functional configurations, and duplicated descriptions are omitted.

First Embodiment

<1. General Configuration of Vehicle Speed Limiting System>

First, an overall configuration of a vehicle speed limiting system having a vehicle speed limiting Electronic Control Unit (ECU) that is one example of a vehicle speed limiting apparatus according to a first embodiment will be described. FIG. 1 illustrates one example of the vehicle speed limiting system. As shown in FIG. 1, the vehicle speed limiting system 100 includes an imaging part 111, a navigation device 112, and the vehicle speed limiting ECU 120. The vehicle speed limiting system 100 further includes a display device 130, an accelerator pedal treading amount (pressing amount) detection device 141, and a power train control device 142.

The imaging part 111 takes an image of a traffic sign of the road where the vehicle is traveling, and sends the thus acquired image information to the vehicle speed limiting ECU 120 with a predetermined frame period. The navigation device 112 determines the position of the traveling vehicle, and sends the speed limit value that is set for the road at the thus determined position to the vehicle speed limiting ECU 120 as navigation information.

The vehicle speed limiting ECU 120 has a speed limit value management program, a speed limiting program, and so forth, installed therein. The vehicle speed limiting ECU 120 functions as a speed limit value management part 121 and a speed limiting part 122 by executing these programs.

The speed limit value management part 121 acquires the speed limit value that is set for the road based on the image information sent by the imaging part 111 or the navigation information sent from the navigation device 112. Also, for limiting the vehicle speed based on the thus acquired the speed limit value, the speed limit value management part 121 calculates a control parameter for controlling the power train to cause the driving force of the vehicle to be the driving force according to the speed limit value, and sends the calculated control parameter to the speed limiting part 122. Hereinafter, the control parameter calculated based on the speed limit value will be referred to as a "first control parameter". Also, hereinafter, a state where the vehicle speed is controlled to be less than or equal to the speed limit value as a result of the power train being controlled according to the first control parameter will be referred to as a "being limited" state. Also, a state where the power train is controlled by a second control parameter (described later) different from the first control parameter will be referred to as a "not being limited" state.

The speed limit value management part 121 displays a switching screen page on the display device 130 after newly acquiring the speed limit value, if the vehicle is in a "being limited" state. Then, under the condition that the driver of the vehicle or an occupant other than the driver performs an allowance operation for the thus displayed switching screen, the speed limit value management part 121 switches the current speed limit value to the thus newly acquired speed limit value, and sends the first control parameter calculated based on the speed limit value, to which the current speed limit value is thus switched, to the speed limiting part 122. Note that, below, for the sake of simplification, a description will be made assuming that an allowance operation is performed by the driver, as one example.

The speed limiting part 122 acquires pedal treading (pressing) amount information from the accelerator pedal treading amount detection device 141. In order to control the vehicle speed based on the thus acquired pedal treading amount information, the speed limiting part 122 calculates the second control parameter for controlling the power train in such a manner that the driving force of the vehicle will be the driving force according to the pedal treading amount.

Also, the speed limiting part 122 compares the first control parameter and the second control parameter, selects one of these control parameters having the lesser driving force of the vehicle, and sends the selected control parameter to the power train control device 142 as control amount information.

Thereby, even if the driver treads on the accelerator pedal with such a treading amount that the speed limit value would be exceeded, the speed limiting part 122 selects the first control parameter calculated based on the speed limit value. Thus, it is possible to control the vehicle speed to be less than or equal to the speed limit value.

The display device 130 displays the switching screen page including the newly acquired speed limit value that is output from the vehicle speed limiting ECU 120. Also, in response to receiving an allowance operation performed by the driver of the vehicle, the display device 130 sends allowance operation information to the vehicle speed limiting ECU 120.

The accelerator pedal treading (pressing) amount detection device 141 detects the treading (pressing) amount of the accelerator pedal that is trodden (pressed) by the driver of the vehicle for adjusting the driving force of the vehicle, and sends the thus detected treading amount to the vehicle speed limiting ECU 120 as the pedal treading amount information. The power train control device 142 controls the power train that sends the driving force generated by the engine to the wheels, and controls the power train based on the limiting amount information sent from the vehicle speed limiting ECU 120.

Note that, concerning the example of FIG. 1, the description has been made assuming that the vehicle speed limiting ECU 120 functions as the speed limit value management part 121 and the speed limiting part 122. However, it is also possible to configure the system in such a manner that a part of these functions is implemented by another ECU separate from the vehicle speed limiting ECU 120.

<2. Hardware Configuration of Vehicle Speed Limiting ECU>

Figure 2:
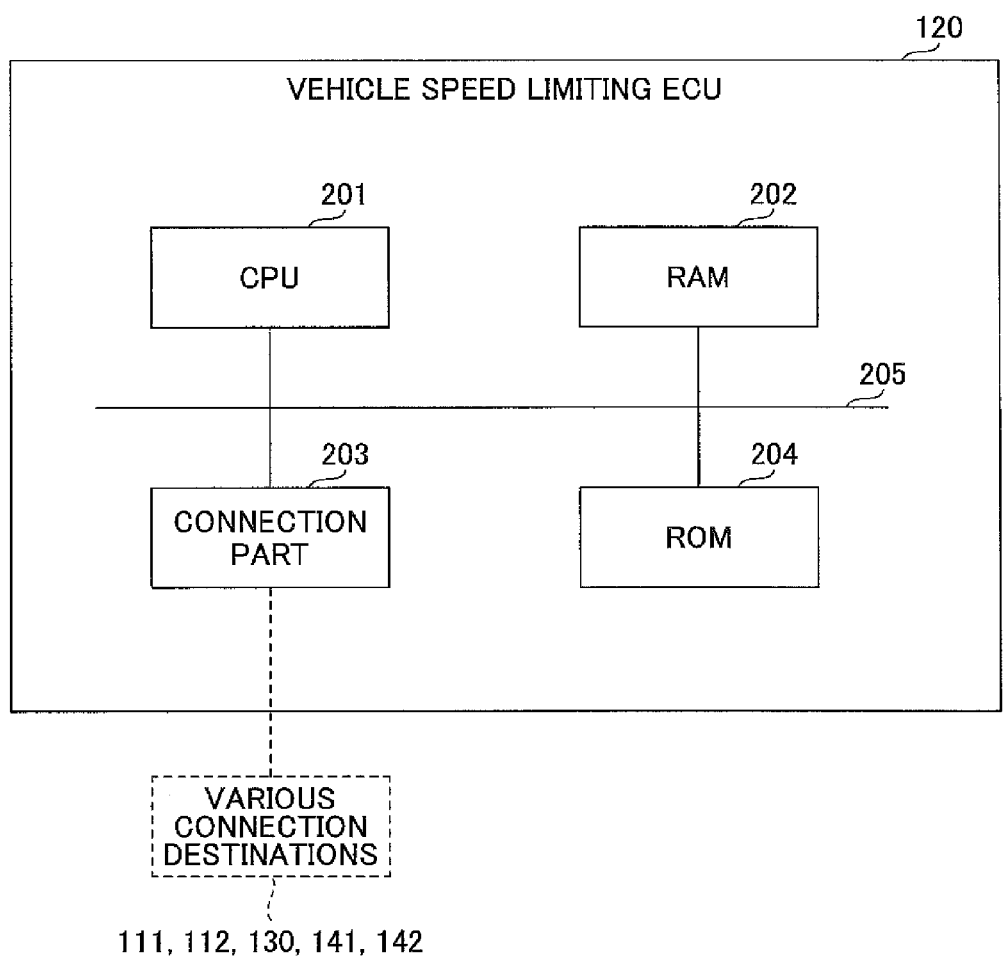
FIG. 2 illustrates one example of a hardware configuration of a vehicle speed limiting ECU.

Next, a hardware configuration of the vehicle speed limiting ECU 120 will be described. FIG. 2 illustrates one example of the hardware configuration of the vehicle speed limiting ECU 120.

As shown in FIG. 2, the vehicle speed limiting ECU 120 includes a CPU (Central Processing Unit) 201, a RAM (Random Access Memory) 202, a connection part 203, and a Read-Only Memory (ROM) 204. Note that, the respective elements of the vehicle speed limiting ECU 120 are mutually connected by a bus 205.

The CPU 201 executes various programs stored by the ROM 204 (i.e., the speed limit value management program, the speed limiting program, and so forth).

The RAM 202 is a main storage such as a Dynamic Random Access Memory (DRAM), a Static Random Access Memory (SRAM), or the like. The RAM 202 provides a work area where the various programs stored by the ROM 204 are expanded to be executed by the CPU 201. Also, the RAM 202 provides a storage area to temporarily store information generated as a result of the various programs stored by the ROM 204 being executed by the CPU 201 (for example, the first control parameter, the second control parameter, or the like).

The connection part 203 is an interface that is connected to various connection destinations such as the imaging part 111, the navigation device 112, the display device 130, the accelerator pedal treading amount detection device 141, the power train control device 142, and so forth, and sends and receives various information items among the various connection destinations.

The ROM 204 is a main storage such as an Erasable Programmable ROM (EPROM), an Electrically Erasable Programmable ROM (EEPROM), or the like, and stores the various programs to be executed by the CPU 201, and information used when the CPU 201 executes the various programs, and so forth.

<3. Functional Configuration of Vehicle Speed Limiting ECU>

Figure 3:
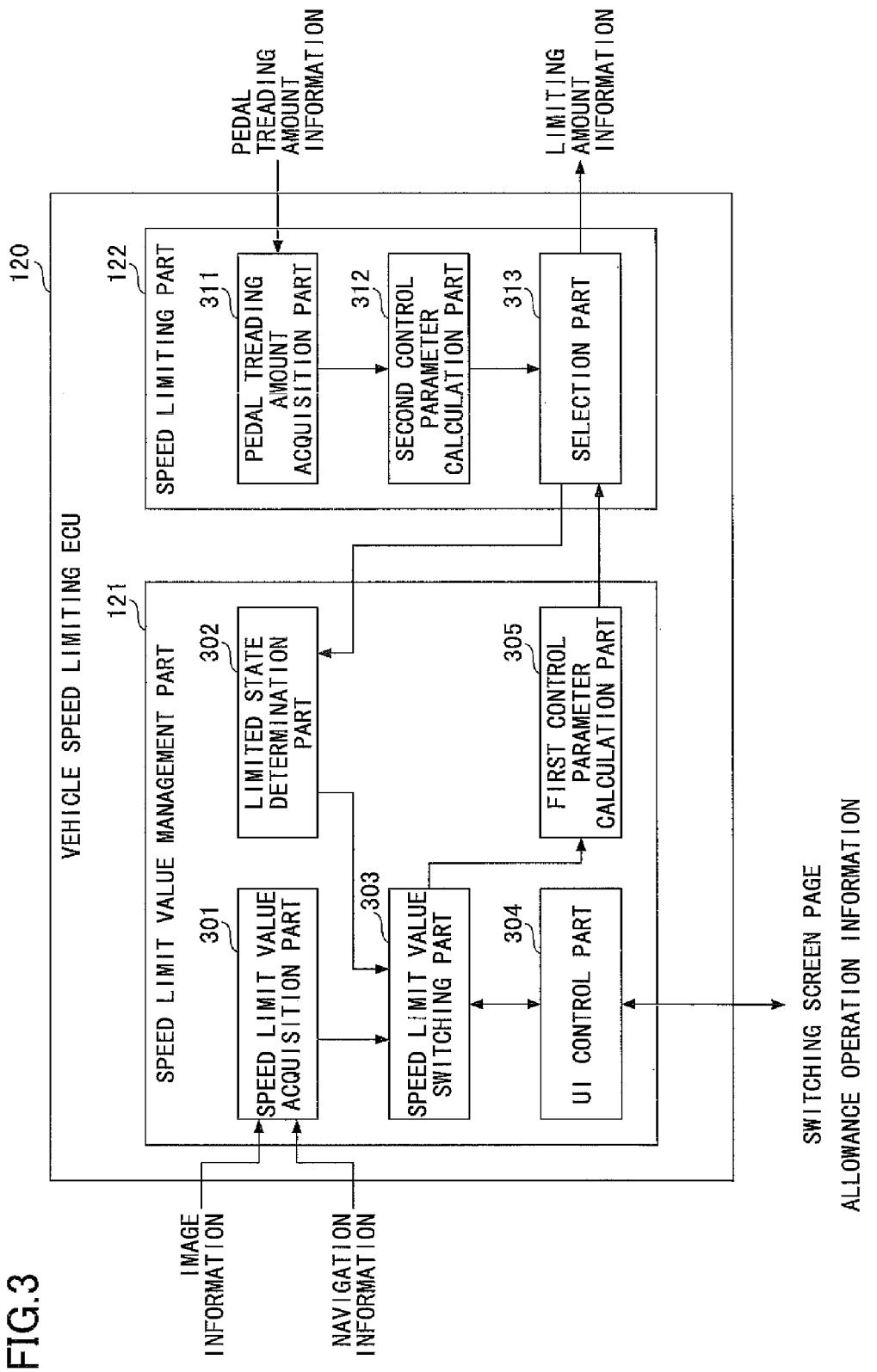
FIG. 3 illustrates one example of a functional configuration of the vehicle speed limiting ECU.

Next, respective functions implemented by the vehicle speed limiting ECU 120 will be described in detail. FIG. 3 illustrates one example of a functional configuration of the vehicle speed limiting ECU 120 in detail.

As shown in FIG. 3, the speed limit value management part 121 includes a speed limit value acquisition part 301, a limited state determination part 302, a speed limit value switching part 303, a UI (user interface) control part 304, and a first control parameter calculation part 305.

The speed limit value acquisition part 301 detects the speed limit value indicated on the traffic sign from the image information sent from the imaging part 111, and acquires the speed limit value that is set for the road on which the vehicle is traveling. Alternatively, the speed limit value acquisition part 301 acquires the speed limit value from the navigation information sent from the navigation device 112. Note that, below, for the sake of simplification, it is assumed, as an example, that the vehicle speed limiting ECU 120 uses the speed limit value detected from the image information.

The speed limit value acquisition part 301 determines a switching timing for switching the current speed limit value to the newly acquired speed limit value, and sends the thus acquired switching timing to the speed limit value switching part 303. The switching timing for switching the current speed limit value to the newly acquired speed limit value is, for example, a timing at which the distance to the position where the traffic sign is installed becomes less than or equal to a predetermined distance.

The limited state determination part 302 determines whether the vehicle is in a "being limited" state or a "not being limited" state based on information sent from the speed limiting part 122, and sends the determination result to the speed limit value switching part 303. Actually, if the information sent from the speed limiting part 122 indicates "being limited", the limited state determination part 302 determines that the vehicle is in a "being limited" state, and sends the determined state to the speed limit value switching part 303. If the information sent from the speed limiting part 122 indicates "not being limited", the limited state determination part 302 determines that the vehicle is in a "not being limited" state, and sends the determined state to the speed limit value switching part 303.

If the speed limit value switching part 303 receives the information indicating the switching timing for switching the current speed limit value to the newly acquired speed limit value from the speed limit value acquisition part 301, the speed limit value switching part 303 determines, based on the state (a "being limited" or a "not being limited" state) of the vehicle at the time of the reception, whether to switch the current speed limit value to the newly acquired speed limit value. In other words, the speed limit value switching part 303 functions as a switching determination part. If the speed limit value switching part 303 determines to switch the speed limit value to the newly acquired speed limit value, the speed limit value switching part 303 sends the newly acquired speed limit value to the first control parameter calculation part 305.

Actually, if the vehicle is in a "not being limited" state at the time when the speed limit value switching part 303 receives the information indicating the switching timing, the speed limit value switching part 303 switches the speed limit value to the newly acquired speed limit value. Then, the speed limit value switching part 303 sends the speed limit value, to which the switching has been thus carried out, to the first control parameter calculation part 305.

If the vehicle is in a "being limited" state at the time when the speed limit value switching part 303 receives the information indicating the switching timing, the speed limit value switching part 303 sends such an instruction to the UT control part 304 to display the switching screen page. If the driver of the vehicle then performs an allowance operation in response to the UI control part 304 thus displaying the switching screen page, and thus the allowance operation information is transmitted, the speed limit value switching part 303 receives the transmitted allowance operation information via the UT control part 304. In this case, the speed limit value switching part 303 switches the speed limit value to the newly acquired speed limit value, and sends the speed limit value, to which the switching is thus carried out, to the first control parameter calculation part 305.

If the driver of the vehicle does not perform an allowance operation in response to the UI control part 304 displaying the switching screen page, and thus, the UI control part 304 does not receive the allowance operation information, the speed limit value switching part 303 does not carry out switching the speed limit value to the newly acquired speed limit value.

Thus, if the vehicle is in a "not being limited" state upon occurrence of the switching timing to the newly acquired speed limit value, the speed limit value switching part 303 immediately carries out switching to the newly acquired speed limit value. If the vehicle is in a "being limited" state, the speed limit value switching part 303 carries out switching to the newly acquired speed limit value under the condition that the driver performs the allowance operation.

The UI control part 304 displays the switching screen page including the newly acquired speed limit value on the display device 130 based on the instruction from the speed limit value switching part 303. If the allowance operation information is transmitted in response to the driver of the vehicle performing the allowance operation in response to the switching screen page displayed on the display device 130, the display device 130 receives the allowance operation information and sends it to the speed limit value switching part 303.

The first control parameter calculation part 305 calculates the first control parameter based on the sent speed limit value if the speed limit value switching part 303 sends the newly acquired speed limit value. The first control parameter includes the throttle opening amount, the engine rotational speed, the engine torque, the driving force, the vehicle speed, the vehicle acceleration, and/or the like. The first control parameter calculation part 305 sends the calculated first control parameter to the speed limiting part 122.

As shown in FIG. 3, the speed limiting part 122 includes a pedal treading amount acquisition part 311, a second control parameter calculation part 312, and a selection part 313.

The pedal treading amount acquisition part 311 acquires the pedal treading amount information according to the treading amount on the accelerator pedal by the driver of the vehicle.

The second control parameter calculation part 312 calculates the second control parameter based on the pedal treading amount information acquired by the pedal treading amount acquisition part 311. Similar to the first control parameter, the second control parameter includes the throttle opening amount, the engine rotational speed, the engine torque, the driving force, the vehicle speed (the pedal vehicle speed), the vehicle acceleration, and/or the like. The second control parameter calculation part 312 sends the calculated second control parameter to the selection part 313.

The selection part 313 carries out a comparison based on the first control parameter sent from the first control parameter calculation part 305 and the second control parameter sent from the second control parameter calculation part 312.

The selection part 313 selects the first control parameter if, as a result of the comparison, the driving force of the vehicle generated when the power train is controlled based on the first control parameter is less than the driving force of the vehicle generated when the power train is controlled based on the second control parameter. The comparison can be such as to be carried out between the first control parameter and the second control parameter themselves. In this case, for example, if the first control parameter is less than the second control parameter, the selection part 313 selects the first control parameter.

The selection part 313 selects the second control parameter if, as a result of the comparison, the driving force of the vehicle generated when the power train is controlled based on the second control parameter is less than or equal to the driving force of the vehicle generated when the power train is controlled based on the first control parameter. As mentioned above, the comparison can be such as to be carried out between the first control parameter and the second control parameter themselves. In this case, if, for example the second control parameter is less than or equal to the first control parameter, the selection part 313 selects the second control parameter.

The selection part 313 transmits the thus selected control parameter to the power train control device 142 as the control amount information to be used to control the power train. Thus, the first control parameter calculated based on the speed limit value and the second control parameter calculated based on the pedal treading amount information are selectively switched therebetween, and the selected one is transmitted to the power train control device 142.

As a result, if the driver treads on the accelerator pedal with such a treading amount as to not exceed the speed limit value, the power train is controlled with the second control parameter calculated based on the pedal treading amount information, and the vehicle is driven with the driving force according to the pedal treading amount.

If the driver treads on the accelerator pedal with such a treading amount as to exceed the speed limit value, the power train is controlled with the first control parameter calculated based on the speed limit value. Thereby, the vehicle is driven with such a driving force that the vehicle speed is less than or equal to the speed limit value, and the vehicle speed is controlled to be less than or equal to the speed limit value.

The selection part 313 determines the state of selecting the first control parameter as a state where the vehicle is in a "being limited" state, and sends the determination result to the limited state determination part 302. The selection part 313 determines the state of selecting the second control parameter as a state where the vehicle is in a "not being limited" state, and sends the determination result to the limited state determination part 302.

<4. Speed Limit Value Management Process by Speed Limit Value Management Part>

Figure 4:
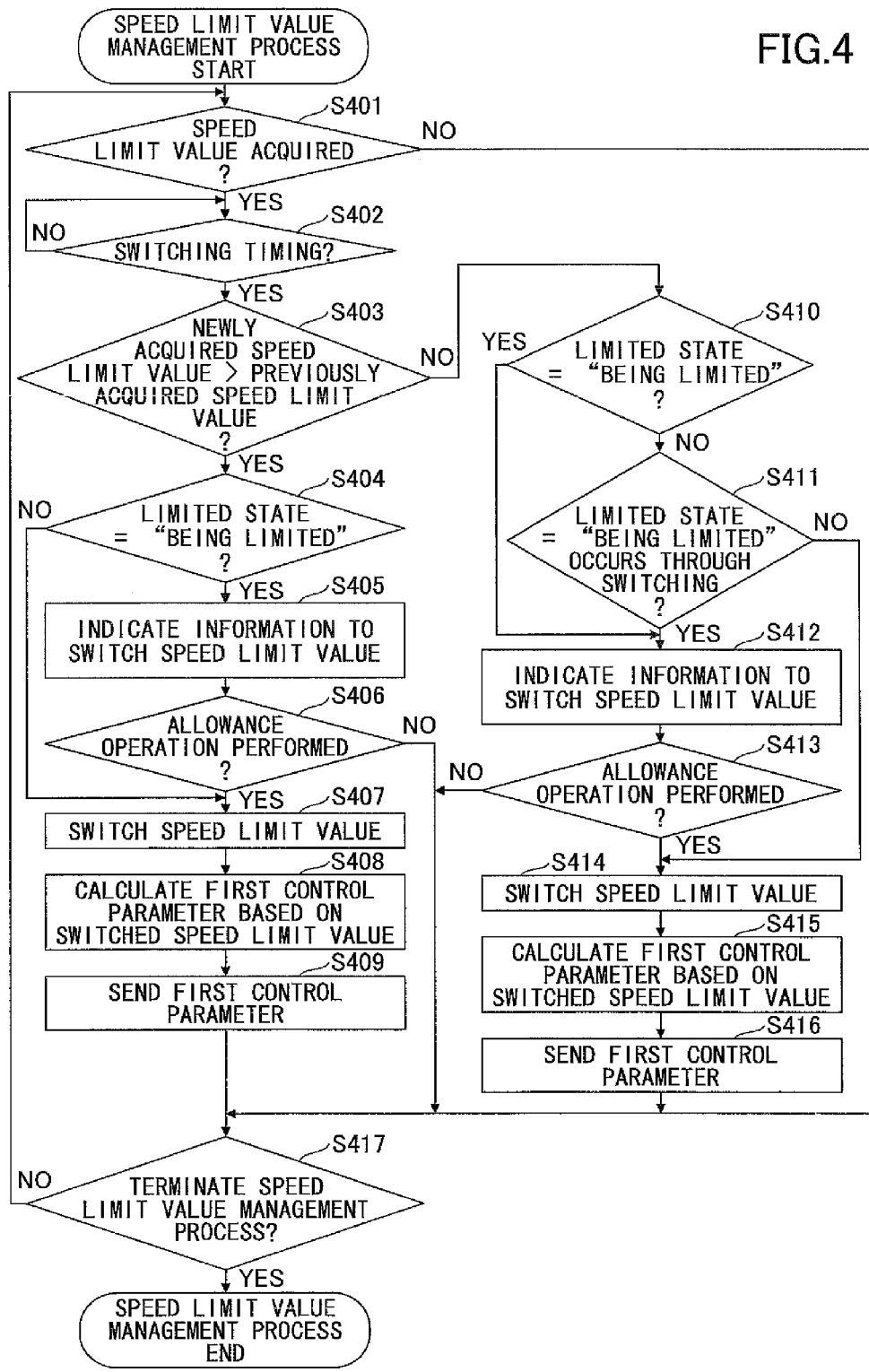
FIG. 4 is a flowchart of a speed limit value management process.

Next, a flow of the speed limit value management process carried out by the speed limit value management part 121 will be described. FIG. 4 is a flowchart of the speed limit value management process carried out by the speed limit value management part 121.

In step S401, the speed limit value acquisition part 301 determines whether the speed limit value acquisition part 301 has newly acquired the speed limit value. In step S401, if the speed limit value acquisition part 301 determines that the speed limit value acquisition part 301 has not newly acquired the speed limit value, the speed limit value acquisition part 301 proceeds to step S417. In step S401, if the speed limit value acquisition part 301 determines that the speed limit value acquisition part 301 has newly acquired the speed limit value, the speed limit value acquisition part 301 proceeds to step S402.

In step S402, the speed limit value acquisition part 301 determines whether it is the switching timing (i.e., whether it is time) to switch to the speed limit value acquired in step S401. If the speed limit value acquisition part 301 determines in step S402 that it is not the switching timing, the speed limit value acquisition part 301 waits until it is determined that it is the switching timing.

If determining in step S402 that it is the switching timing, the speed limit value acquisition part 301 proceeds to step S403. In step S403, the speed limit value switching part 303 compares the speed limit value newly acquired in step S401 with the previously acquired speed limit value.

In step S403, if the newly acquired speed limit value is greater than the previously acquired speed limit value (in other words, if the switching is such as to increase the speed limit value) as a result of the comparison, the process proceeds to step S404. In step S404, the limited state determination part 302 determines whether the vehicle is in a "being limited" state.

In step S404, if the limited state determination part 302 determines that the vehicle is in a "being limited" state, the process proceeds to step S405. In step S405, the UI control part 304 displays the switching screen page including the newly acquired speed limit value on the display device 130, and queries the driver whether to allow the switching to the newly acquired speed limit value.

In step S406, the UI control part 304 determines whether the driver of the vehicle performs an allowance operation for the switching to the newly acquired speed limit value. In step S406, if the UI control part 304 determines that the driver of the vehicle performs the allowance operation, the process proceeds to step S407.

In step S404, if the limited state determination part 302 determines that the vehicle is in a "not being limited" state, the process proceeds to step S407 directly.

In step S407, the speed limit value switching part 303 switches the current speed limit value to the newly acquired speed limit value, and sends the speed limit value, to which the switching has been thus carried out, to the first control parameter calculation part 305.

In step S408, the first control parameter calculation part 305 calculates the first control parameter based on the speed limit value, to which the switching has been thus carried out. In step S409, the first control parameter calculation part 305 sends the calculated first control parameter to the selection part 313, and the process proceeds to step S417.

In step S406, if the UI control part 304 determines that the driver of the vehicle does not perform the allowance operation, the process proceeds to step S417 directly. In this case, the first control parameter is not calculated based on the newly acquired the speed limit value, and the selection part 313 continues to use the first control parameter calculated based on the previously acquired speed limit value.

In step S403, if the newly acquired speed limit value is less than or equal to the previously acquired speed limit value (in other words, if the switching is such as to lower the speed limit value) as a result of the comparison, the process proceeds to step S410. In step S410, the limited state determination part 302 determines whether the vehicle is in a "being limited" state.

In step S410, if the limited state determination part 302 determines that the vehicle is in a "being limited" state, the process proceeds to step S412.

In step S410, if the limited state determination part 302 determines that the vehicle is in a "not being limited" state, the process proceeds to step S411. In step S411, the speed limit value switching part 303 determines whether the vehicle will enter a "being limited" state if switching is carried out to the newly acquired speed limit value. Actually, the speed limit value switching part 303 compares the first control parameter calculated based on the newly acquired speed limit value with the second control parameter calculated based on the current pedal treading amount information. If the first control parameter calculated based on the newly acquired speed limit value is less than the second control parameter calculated based on the current pedal treading amount information as a result of the comparison, the speed limit value switching part 303 determines that the vehicle will enter a "being limited" state. In this case, the process proceeds to step S412.

In step S412, the UI control part 304 displays the switching screen page including the newly acquired speed limit value on the display device 130, and queries the driver whether to allow switching to the newly acquired speed limit value.

In step S413, the UI control part 304 determines whether the driver of the vehicle has performed an allowance operation for the switching to the newly acquired speed limit value. In step S413, if determining that the driver of the vehicle has performed the allowance operation, the process proceeds to step S414.

In step S411, if the speed limit value switching part 303 determines that the vehicle will not enter a "being limited" state, the process proceeds to step S414 directly.

In step S414, the speed limit value switching part 303 switches the current speed limit value to the newly acquired speed limit value, and sends the speed limit value, to which the switching has been thus carried out, to the first control parameter calculation part 305.

In step S415, the first control parameter calculation part 305 calculates the first control parameter based on the speed limit value, to which the switching has been thus carried out. In step S416, the first control parameter calculation part 305 sends the calculated first control parameter to the selection part 313, and thus, the process proceeds to step S417.

In step S413, if the UI control part 304 determines that the driver of the vehicle has not performed the allowance operation, the process proceeds to step S417 directly. In this case, the first control parameter is not calculated based on the newly acquired speed limit value, and the selection part 313 continuously uses the first control parameter calculated based on the previously acquired speed limit value.

In step S417, the speed limit value acquisition part 301 determines whether there has been received a termination instruction for terminating the speed limit value management process. If the speed limit value acquisition part 301 determines there has not been received a termination instruction for terminating the speed limit value management process, the process returns to step S401. If the speed limit value acquisition part 301 determines there has been received a termination instruction for terminating the speed limit value management process, the speed limit value management process is terminated.

Thus, according to the first embodiment, if the vehicle is in a "being limited" state, information concerning switching to the newly acquired speed limit value is given to the driver. Under the condition that the driver performs an allowance operation for the switching, the switching is carried out.

Even if the vehicle is in a "not being limited" state, information concerning switching to the newly acquired speed limit value is given to the driver and the switching is carried out under the condition that the driver has performed the allowance operation for the switching, if the vehicle will enter a "being limited" state as a result of the speed limit value falling.

Thereby, the driver can know, before an occurrence of actual switching, that the switching of the speed limit value is to be carried out, and the driver himself or herself can determine whether to actually carry out the switching. In other words, it is possible to reduce occurrence of the driver's feeling that something is wrong when a variation occurs in the vehicle speed due to switching of the speed limit value in a state where the driving force of the vehicle is limited based on the speed limit value.

As a result, it is possible to reduce occurrence of a feeling that something is wrong when the vehicle speed varies due to switching of the speed limit value.

Further, according to the first embodiment, when the vehicle is in a "not being limited" state, switching to the newly acquired speed limit value is carried out immediately without giving information concerning the switching to the driver.

Thus, if a variation in the vehicle speed that may cause a feeling by the driver that something is wrong will not occur even though switching to the newly acquired speed limit value is carried out, the switching is carried out automatically without notifying the driver. Thereby, it is possible to reduce the operation load of the driver at a time of switching of the speed limit value.

<5. Speed Limiting Process by Speed Limiting Part>

Figure 5:
FIG. 5 is a flowchart of a speed limiting process.

Next, a flow of the speed limiting process carried out by the speed limiting part 122 will be described. FIG. 5 is a flowchart of the speed limiting process carried out by the speed limiting part 122.

In step S501, the pedal treading amount acquisition part 311 acquires the pedal treading amount information. In step S502, the second control parameter calculation part 312 calculates the second control parameter based on the thus acquired pedal treading amount information.

In step S503, the selection part 313 compares the driving force of the vehicle generated when the power train is controlled based on the first control parameter and the driving force of the vehicle generated when the power train is controlled based on the second control parameter.

If the selection part determines as a result of the comparison that the driving force of the vehicle generated when the power train is controlled based on the second control parameter is greater than the driving force of the vehicle generated when the power train is controlled based on the first control parameter, the process proceeds to step S504.

In step S504, the selection part 313 determines that the vehicle is in a "being limited" state, and sends the determination result to the limited state determination part 302. In step S505, the selection part 313 transmits the first control parameter to the power train control device 142 as information for controlling.

If the selection part determines as a result of the comparison that the driving force of the vehicle generated when the power train is controlled based on the second control parameter is less than or equal to the driving force of the vehicle generated when the power train is controlled based on the first control parameter, the process proceeds to step S506.

In step S506, the selection part 313 determines that the vehicle is in a "not being limited" state, and sends the determination result to the limited state determination part 302. In step S507, the selection part 313 transmits the second control parameter to the power train control device 142 as information for controlling.

In step S508, the selection part 313 determines whether there has been received a termination instruction for terminating the speed limiting process. In step S508, if the selection part 313 determines that a termination instruction for terminating the speed limiting process has not been received, the process returns to step S501, and the process from step S501 through step S507 is carried out.

In step S508, if the selection part 313 determines that a termination instruction for terminating the speed limiting process has been received, the speed limiting process is terminated.

<6. Actual Examples>

Next, actual examples of the speed limit value management process and the speed limiting process will be described. FIGS. 6A-9B illustrates actual examples of the speed limit value management process and the speed limiting process for various travelling scenarios. Below, a description will be made based on the travelling scenarios shown in FIGS. 6A-9B.

FIGS. 6A and 6B illustrate actual examples of the speed limit value management process and the speed limiting process when the vehicle is in a "being limited" state, and the speed limit value greater than the current speed limit value is newly acquired.

It is assumed that travelling of the vehicle is started in a state where "60 km/h" is acquired based on a traffic sign 601 as the speed limit value 611, and the first control parameter is calculated based on the speed limit value 611.

In the example of FIG. 6A, if the current vehicle speed (the actual vehicle speed) 621 is less than "60 km/h" that is the speed limit value 611, the current vehicle speed 621 is coincident with the pedal vehicle speed 622 (i.e., the vehicle speed calculated based on the pedal treading amount information). In other words, if the current vehicle speed 621 is less than "60 km/h" that is the speed limit value 611, the current vehicle speed 621 changes according to the pedal vehicle speed 622. On the other hand, when the current vehicle speed 621 reaches "60 km/h" that is the speed limit value 611, the current vehicle speed 621 thereafter remains as "60 km/h" that is the speed limit value 611.

It is then assumed that the speed limit value acquisition part 301 newly acquires "80 km/h" as the speed limit value 612 based on a traffic sign 602. At this time, the vehicle is in a "being limited" state. Therefore, when the vehicle approaches the position where the traffic sign 602 is installed, the UI control part 304 displays the switching screen page 630 on the display device 130 including the newly acquired speed limit value 612.

In the switching screen page 630, "80 km/h" is displayed as the newly acquired speed limit value 612. Also, a "Yes" button 631 is displayed which is pressed if the driver allows switching to the newly acquired speed limit value 612. Also, a "No" button 632 is displayed which is pressed if the driver does not allow the newly acquired speed limit value 612.

In the example of FIG. 6A, the driver of the vehicle presses the "Yes" button 631. Therefore, when the vehicle passes through the position where the traffic sign 602 is installed, the speed limit value is switched to the newly acquired speed limit value 612 (see the broken line 623). Thereby, due to the first control parameter calculated based on the speed limit value 612, to which the switching is thus carried out, the power train is controlled and the vehicle is accelerated. As a result, the current vehicle speed 621 of the vehicle reaches "80 km/h" that is the newly acquired speed limit value 612. Thereafter, the current vehicle speed 621 remains as "80 km/h" that is the speed limit value 612, to which the switching is thus carried out.

In the example of FIG. 6B, if the driver of the vehicle presses the "No" button 632, no switching is carried out to the newly acquired speed limit value 612 (see the broken line 623). Therefore, even if the vehicle passes through the position where the traffic sign 602 is installed, the power train is controlled with the first control parameter calculated based on the previously acquired speed limit value 611. Therefore, the current vehicle speed 621 remains as "60 km/h".

Figure 7:
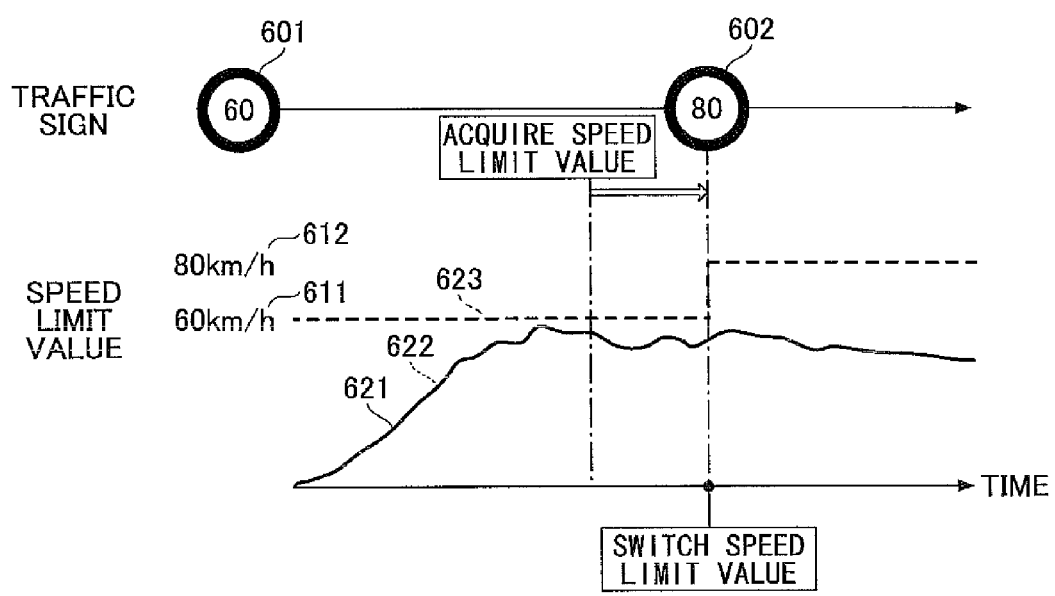
FIG. 7 illustrates an actual example of the speed limit value management process and the speed limiting process.

FIG. 7 illustrates an actual example of the speed limit value management process and the speed limiting process for a case where, in a state where the vehicle is in a "not being limited" state, the speed limit value greater than the current speed limit value is newly acquired.

It is assumed that travelling is started in a state where, "60 km/h" is acquired based on a traffic sign 601 as the speed limit value 611, and the first control parameter is calculated based on the speed limit value 611.

As shown in FIG. 7, if the current vehicle speed 621 is less than "60 km/h" that is the speed limit value 611, the current vehicle speed 621 is coincident with the pedal vehicle speed 622. In other words, if the current vehicle speed 621 is less than "60 km/h" that is the speed limit value 611, the current vehicle speed 621 changes according to the pedal vehicle speed 622.

It is then assumed that the speed limit value acquisition part 301 newly acquires "80 km/h" based on a traffic sign 602 as the speed limit value 612. At this time, the vehicle is in a "not being limited" state. Therefore, the switching screen page 630 is not displayed, and, when the vehicle passes through the position where the traffic sign 602 is installed, switching is carried out to "80 km/h" that is the newly acquired speed limit value 612 (see the broken line 623).

In the example of FIG. 7, the pedal vehicle speed 622 is less than or equal to the newly acquired speed limit value 612. Therefore, even when the switching to the newly acquired speed limit value 612 is carried out, the switching has no influence on the current vehicle speed 621.

Figure 8A:
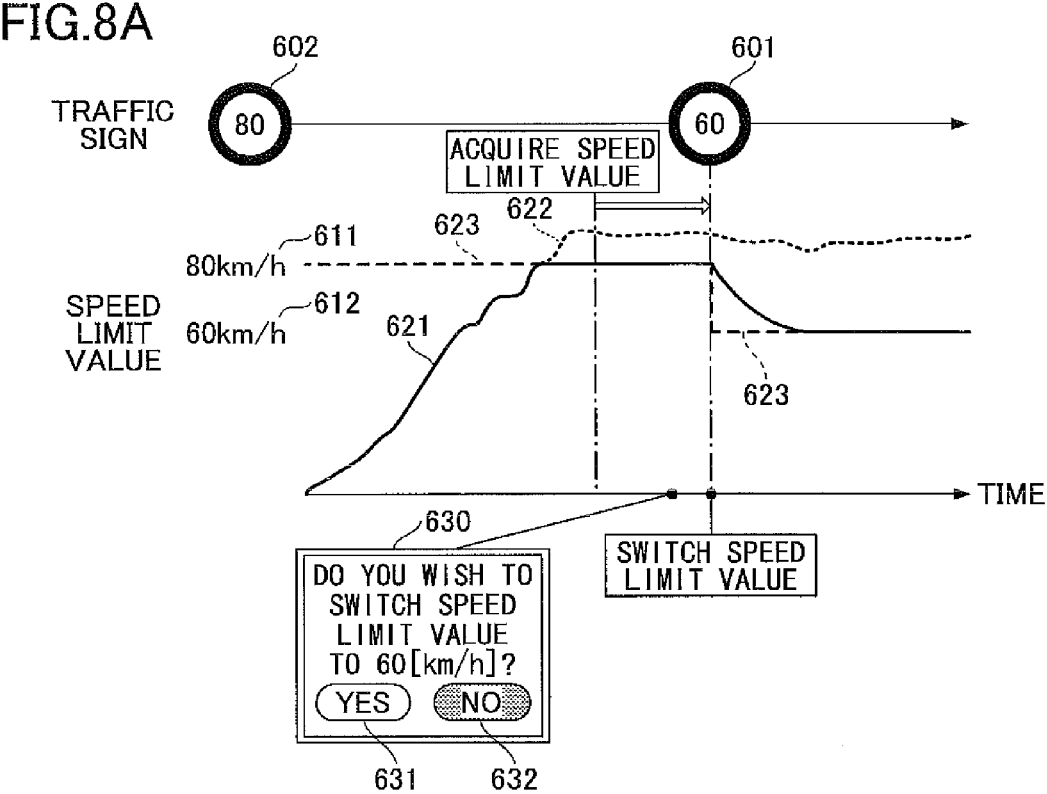
FIGS. 8A and 8B illustrate actual examples of the speed limit value management process and the speed limiting process.
Figure 8B:
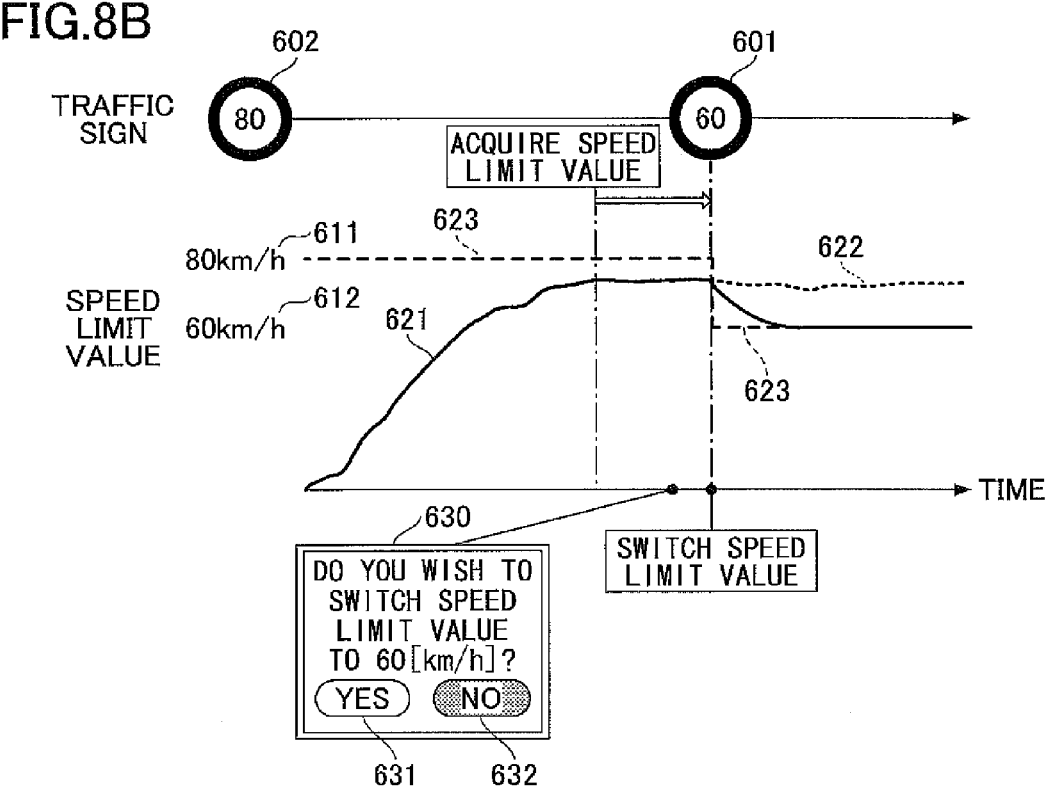

FIGS. 8A and 8B illustrate actual examples of the speed limit value management process and the speed limiting process when the speed limit value less than the current speed limit value is currently acquired.

It is assumed that travelling of the vehicle is started in a state where "80 km/h" is acquired based on a traffic sign 602 as the speed limit value 611, and the first control parameter is calculated based on the speed limit value 611.

In the example of FIG. 8A, if the current vehicle speed 621 is less than "80 km/h" that is the speed limit value 611, the current vehicle speed 621 is coincident with the pedal vehicle speed 622. In other words, if the current vehicle speed 621 is less than "80 km/h" that is the speed limit value 611, the current vehicle speed 621 changes according to the pedal vehicle speed 622. If the current vehicle speed 621 reaches "80 km/h" that is the speed limit value 611, the current vehicle speed 621 thereafter stands as "80 km/h" that is the speed limit value 611.

It is then assumed that the speed limit value acquisition part 301 newly acquires "60 km/h" as the speed limit value 612 based on a traffic sign 601. At this time, the vehicle is in a "being limited" state. Therefore, if the vehicle approaches the position where the traffic sign 601 is installed, the UI control part 304 displays the switching screen page 630 including the newly acquired speed limit value 612.

In the switching screen page 630, "60 km/h" is displayed as the newly acquired speed limit value 612. In the example of FIG. 8A, the driver of the vehicle presses the "Yes" button 631. Therefore, when the vehicle passes through the position where the traffic sign 601 is installed, switching to the newly acquired speed limit value 612 is carried out (see the broken line 623). Thus, the power train is controlled by the first control parameter calculated based on the speed limit value 612, to which the switching is thus carried out, and thus, the vehicle decelerates. As a result, the current vehicle speed 621 of the vehicle reaches "60 km/h" that is the speed limit value 612, to which the switching is thus carried out. Thereafter, the current vehicle speed 621 remains as the speed limit value 612 "60 km/h", to which the switching is thus carried out.

In the example of FIG. 8B, the vehicle is in a "not being limited" state at the time when the speed limit value acquisition part 301 acquires the speed limit value 612. However, when switching is carried out to the newly acquired speed limit value 612, the vehicle enters a "being limited" state.

In this case, the UI control part 304 displays the switching screen page 630 including the newly acquired speed limit value 612. In the switching screen page 630, "60 km/h" is displayed as the newly acquired speed limit value 612. In the example of FIG. 8B, the driver of the vehicle presses the "Yes" button 631. Therefore, when the vehicle passes through the position where the traffic sign 601 is installed, switching is carried out to the newly acquired speed limit value 612 (see the broken line 623).

At the time when the switching is thus carried out to the newly acquired speed limit value 612, the current vehicle speed 621 is less than the speed limit value 611 before being thus switched. Therefore, deceleration is started from the current vehicle speed 621 less than the speed limit value 611. Thereafter, the current vehicle speed 621 reaches "60 km/h" that is the speed limit value 612, to which the switching is thus carried out. Thereafter, the current vehicle speed 621 of the vehicle remains as "60 km/h" that is the speed limit value 612, to which the switching is thus carried out.

FIGS. 9A and 9B illustrate actual examples of the speed limit value management process and the speed limiting process for a case where the speed limit value less than the current speed limit value is acquired. In the example of FIG. 9A, if "60 km/h" is newly acquired as the speed limit value 612 when the vehicle is in a "being limited" state, the UI control part 304 displays the switching screen page 630 including the newly acquired speed limit value 612.

As shown in FIG. 9A, when the driver of the vehicle presses the "No" button 632, no switching is carried out to the newly acquired speed limit value 612 even when the vehicle passes through the position where the traffic sign 601 is installed (see the broken line 623). In other words, the current vehicle speed 621 remains as "80 km/h" that is the previous speed limit value 611.

In the example of FIG. 9B, the switching screen page 630 is not displayed, if the "not being limited" state is still maintained even after switching to the speed limit value 612 is carried out when the vehicle is in a "not being limited" state. In other words, when the vehicle passes through the position where the traffic sign 601 is installed, switching is automatically carried out to "60 km/h" that is the newly acquired speed limit value 612 (see the broken line 623).

In the example of FIG. 9B, even after the switching to the newly acquired speed limit value 612, the pedal vehicle speed 622 is still less than or equal to "60 km/h" that is the speed limit value 612, to which the switching is thus carried out. Thus, the switching has no influence on the current vehicle speed 621.

<7. Summary of First Embodiment>

As can be seen from the above description, according to the first embodiment, in the vehicle speed limiting apparatus where the driving force of the vehicle is limited based on the speed limit value that is set for the road where the vehicle is travelling, it is determined whether the vehicle is in a state where the driving force of the vehicle is limited, if it is determined that the vehicle is in a state where the driving force of the vehicle is limited, the switching screen page is displayed to switch the speed limit value (if the speed limit value of the road changes), and under the condition that the driver performs an allowance operation allowing the switching in response to the switching screen page being displayed, the speed limit value is actually switched.

Thereby, the driver can know, before actual switching, that the switching of the speed limit value is to be carried out. Also, the driver can determine whether to actually carry out the switching by himself or herself. As a result, it is possible to avoid the occurrence of the driver having a feeling that something is wrong when a variation in the vehicle speed occurs due to switching of the speed limit value in a state where the driving force of the vehicle is limited based on the speed limit value.

Second Embodiment

In the above-described first embodiment, the switching screen page is displayed, and then, actual switching is carried out under the condition that the driver performs an allowance operation in response to the switching screen page being displayed, for reducing occurrence of the driver's feeling that something is wrong due to a variation in the vehicle speed caused by switching of the speed limit value.

According to the second embodiment, a variation in the vehicle speed occurring due to switching of the speed limit value is made gentler, and thus, such a variation in the vehicle speed as to give a feeling that something is wrong to the driver is avoided. Thus, the occurrence of driver's feeling that something is wrong when the vehicle speed varies due to switching of the speed limit value is reduced. Below, the second embodiment will be described in detail. The description will be made focusing on the differences from the first embodiment.

<1. Functional Configuration of Vehicle Speed Limiting ECU>

Figure 10:
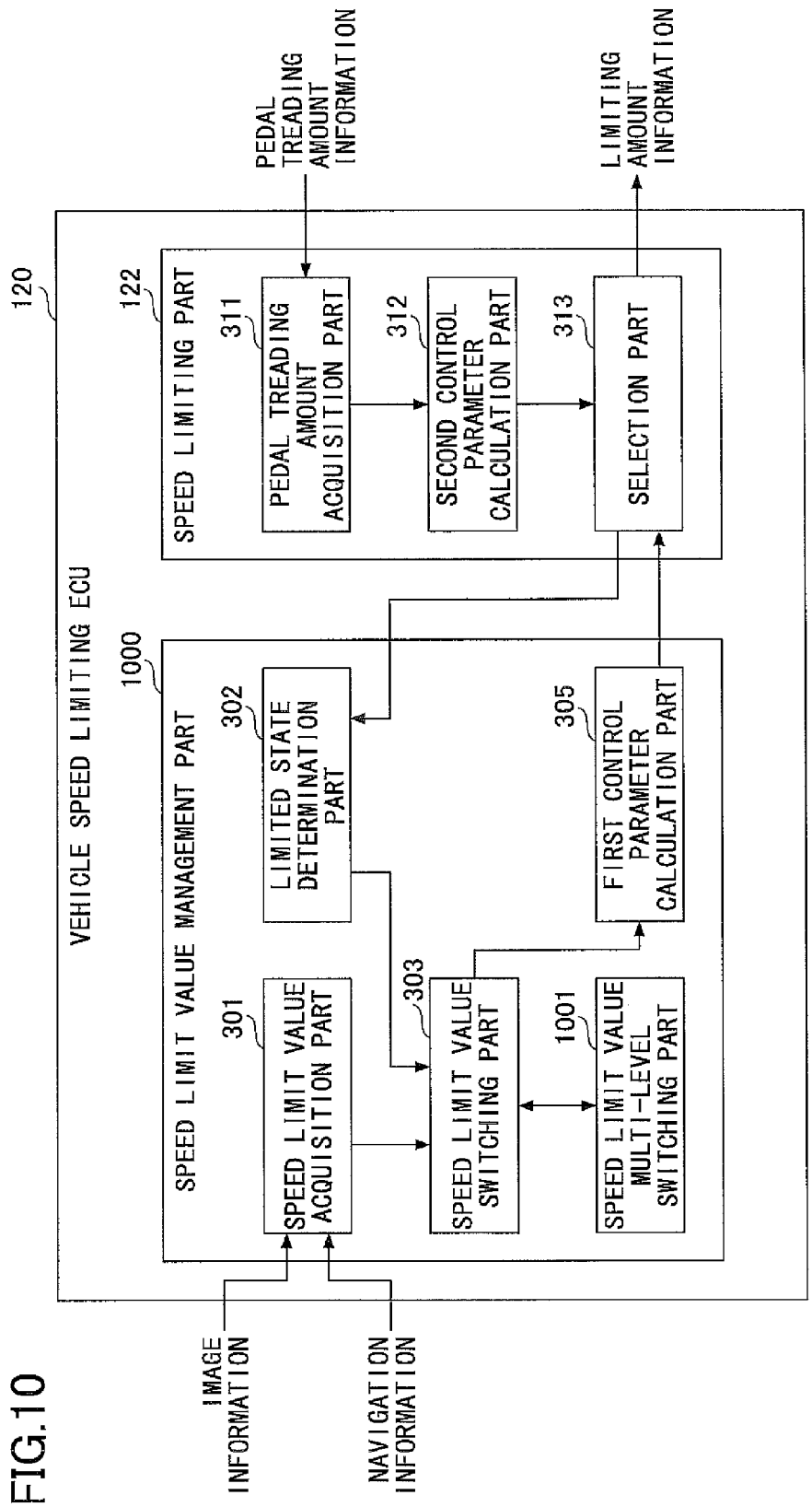
FIG. 10 illustrates one example of a functional configuration of the vehicle speed limiting ECU.

First, the functional configuration of the vehicle speed limiting ECU 120 according to the second embodiment will be described. FIG. 10 illustrates one example of the functional configuration of the vehicle speed limiting ECU 120.

What is different from FIG. 3 is that a speed limit value management part 1000 has a speed limit value multi-level switching part 1001, and does not have the UI control part 304.

When carrying out switching to the newly acquired speed limit value, the speed limit value multi-level switching part 1001 divides the difference between the speed limit value before being switched and the speed limit value to which the switching is to be carried out to a plurality of levels, and carries out switching to the speed limit value levels at predetermined time intervals in sequence. Thus, it is possible to make a variation in the vehicle speed which occurs until the vehicle speed reaches the vehicle speed corresponding to the newly acquired speed limit value from the vehicle speed corresponding to the speed limit value before being switched more gentle.

In other words, even if switching to the newly acquired speed limit value is carried out, sudden acceleration or sudden deceleration of the vehicle does not occur. Therefore, even without displaying the switching screen page to receive the allowance operation, it is possible to reduce the driver's feeling that something is wrong.

<2. Speed Limit Value Management Process by Speed Limit Value Management Part>

Figure 11:
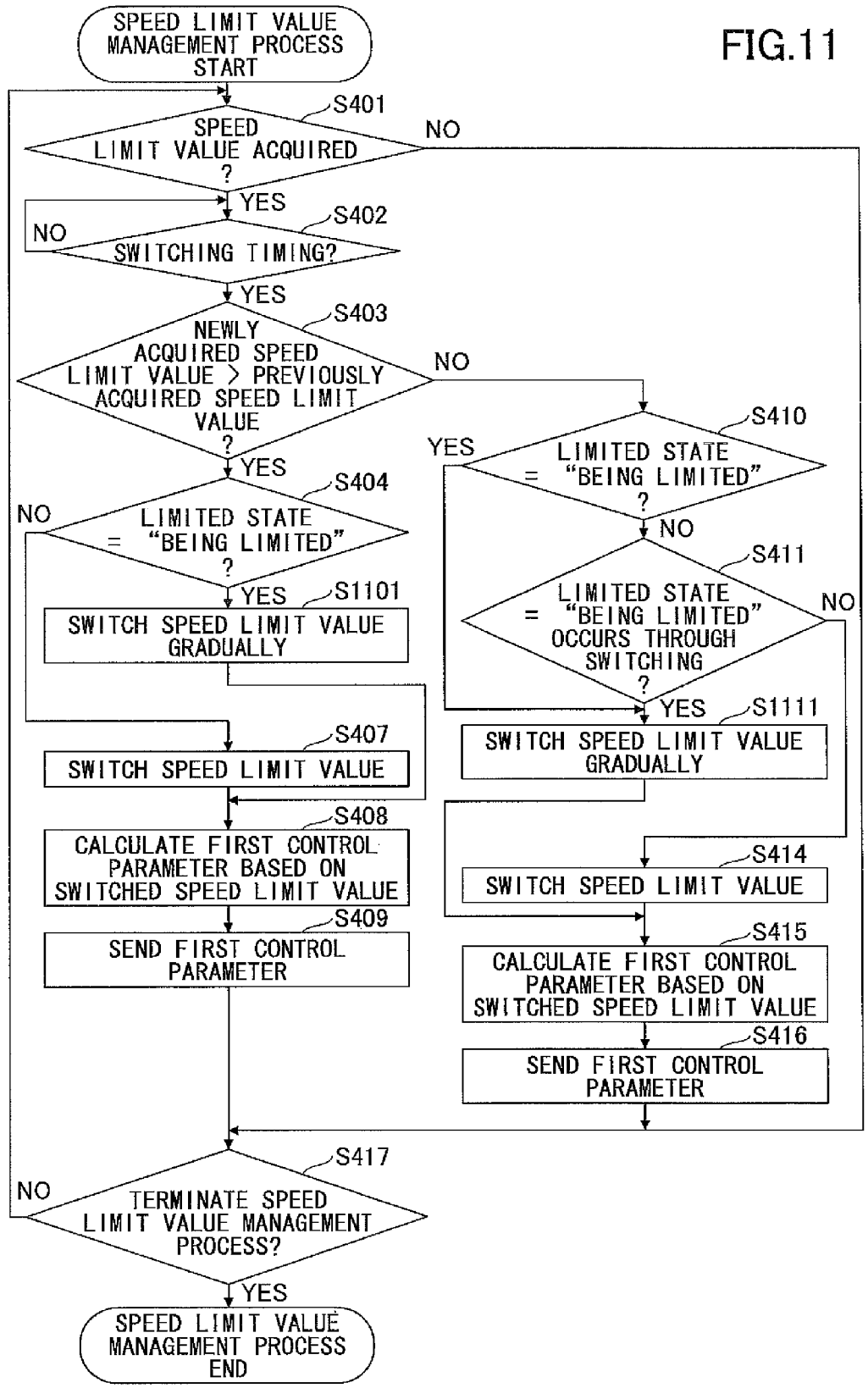
FIG. 11 is a flowchart illustrating one example of the speed limit value management process.

Next, a flow of the speed limit value management process carried out by the speed limit value management part 1000 will be described. FIG. 11 is a flowchart of the speed limit value management process carried out by the speed limit value management part 1000. Note that what is different from the speed limit value management process shown in FIG. 4 is steps S1101 and S1111.

In step S1101, the speed limit value multi-level switching part 1001 divides the difference between the speed limit value before being switched and the newly acquired speed limit value into respective divisions at a plurality of levels, and carries out switching to the speed limit value levels at predetermined time intervals in sequence.

In the same way, in step S1111, the speed limit value multi-level switching part 1001 divides the difference between the speed limit value before being switched and the newly acquired speed limit value into respective divisions at a plurality of levels, and carries out switching to the speed limit value levels at predetermined time intervals in sequence.

<3. Actual Example>

Figure 13:
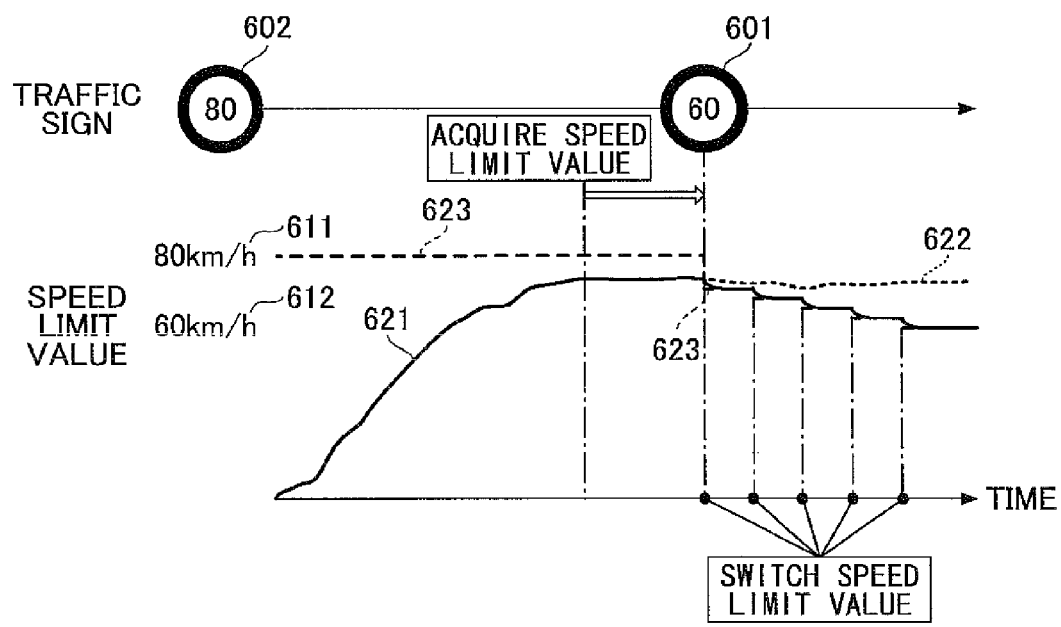
FIG. 13 illustrates an actual example of the speed limit value management process and the speed limiting process.

Next, actual examples of the speed limit value management process and the speed limiting process will be described. FIGS. 12A, 12B and 13 illustrate actual examples of the speed limit value management process and the speed limiting process. FIG. 12A illustrates a case where the speed limit value greater than the current speed limit value is newly acquired. FIG. 12B illustrates a case where the speed limit value less than the current speed limit value is currently acquired. FIG. 13 illustrates a case where the speed limit value less than the current speed limit value is currently acquired, and the vehicle enters a "being limited" state as a result of the speed limit value thus falling.

As shown in FIG. 12A, it is assumed that the speed limit value acquisition part 301 newly acquires "80 km/h" based on a traffic sign 602 as the speed limit value 612. In this case, when the vehicle passes through the position where the traffic sign 602 is installed, switching is carried out to the newly acquired speed limit value 612 (see the broken line 623).

At this time, the speed limit value multi-level switching part 1001 divides the difference between "60 km/h" that is the speed limit value 611 before being switched and "80 km/h" that is the newly acquired speed limit value 612 into respective divisions at five levels. Then, switching is carried out to the speed limit value levels at predetermined time intervals in sequence.

Actually, first, the speed limit value multi-level switching part 1001 carries out switching to "64 km/h" that is the speed limit value of the first level. Thereby, the power train is controlled with the first control parameter calculated based on the speed limit value of the first level. As a result, the current vehicle speed 621 reaches "64 km/h" that is the speed limit value of the first level.

After a predetermined period of time has elapsed from when the speed limit value of the first level is thus reached, the speed limit value multi-level switching part 1001 carries out switching to "68 km/h" that is the speed limit value of the second level. Thereby, the power train is controlled with the first control parameter calculated based on the speed limit value of the second level. As a result, the current vehicle speed 621 reaches "68 km/h" that is the speed limit value of the second level.

After a predetermined period of time has elapsed from when the speed limit value of the second level is thus reached, the speed limit value multi-level switching part 1001 carries out switching to "72 km/h" that is the speed limit value of the third level. Thereafter, in the same way, switching is carried out to the respective speed limit values ("76 km/h" and "80 km/h") of the fourth and fifth levels in sequence.

Thereby, it is possible to make a variation in the vehicle speed occurring until switching is carried out to the newly acquired speed limit value 612 gentler.

In the same way, as shown in FIG. 12B, it is assumed that the speed limit value acquisition part 301 newly acquires "60 km/h" based on a traffic sign 601 as the speed limit value 612. In this case, when the vehicle passes through the position where the traffic sign 601 is installed, switching is carried out to the newly acquired speed limit value 612 (see the broken line 623).

At this time, the speed limit value multi-level switching part 1001 divides the difference between "80 km/h" that is the speed limit value 611 before being switched and "60 km/h" that is the newly acquired speed limit value 612 into the respective divisions at 5 levels. Then, switching is carried out in sequence to the speed limit value levels at predetermined time intervals.

Actually, first, the speed limit value multi-level switching part 1001 carries out switching to "76 km/h" that is the speed limit value of the first level. Thereby, the power train is controlled by the first control parameter calculated based on the speed limit value of the first level. As a result, the current vehicle speed 621 reaches "76 km/h" that is the speed limit value of the first level.

After a predetermined period of time has elapsed from when the speed limit value of the first level is reached, the speed limit value multi-level switching part 1001 carries out switching to "72 km/h" that is the speed limit value of the second level. Thereby, the power train is controlled by the first control parameter calculated based on the speed limit value of the second level. As a result, the current vehicle speed 621 reaches "72 km/h" that is the speed limit value of the second level.

After a predetermined period time has elapsed from when the speed limit value of the second level is reach, the speed limit value multi-level switching part 1001 carries out switching to "68 km/h" that is the speed limit value of the third level. Thereafter, in the same way, the speed limit value multi-level switching part 1001 carries out switching to the respective speed limit values ("64 km/h" and "60 km/h") of the fourth and fifth levels in sequence.

Thereby, it is possible to make a variation in the vehicle speed occurring until switching is carried out to the newly acquired speed limit value 612 gentler.

In the same way, as shown in FIG. 13, it is assumed that the speed limit value acquisition part 301 newly acquires "60 km/h" based on a traffic sign 601 as the speed limit value 612. In the example of FIG. 13, at the time when the speed limit value acquisition part 301 newly acquires the speed limit value 612 "60 km/h", the vehicle is in a "not being limited" state. However, as a result of switching to the newly acquired speed limit value 612, the vehicle enters a "being limited" state.

In this case, when the vehicle passes through the position where the traffic sign 601 is installed, the speed limit value is lowered to the current vehicle speed 621, and thereafter, the difference between the current vehicle speed 621 and the newly acquired speed limit value 612 is divided into the respective divisions at 4 levels. Then, at predetermined time intervals, switching is carried out to the speed limit value levels in sequence (see the broken line 623).

Actually, first, the speed limit value multi-level switching part 1001 switches the speed limit value to the value equal to the current vehicle speed 621 (here, it is assumed as "72 km/h") as the speed limit value of the first level. Thereby, the power train is controlled with the first control parameter calculated based on the speed limit value (here, equal to the second control parameter). Therefore, the current vehicle speed 621 does not change.

Then, the speed limit value multi-level switching part 1001 carries out switching to "69 km/h" that is the speed limit value of the second level. Therefore, the power train is controlled with the first control parameter calculated based on the speed limit value of the second level. As a result, the current vehicle speed 621 reaches "69 km/h" that is the speed limit value of the second level.

After a predetermined period of time has elapsed from when the speed limit value of the second level is reached, the speed limit value multi-level switching part 1001 carries out switching to "66 km/h" that is the speed limit value of the third level. Thereafter, in the same way, the speed limit value multi-level switching part 1001 carries out switching to the respective speed limit values ("63 km/h" and "60 km/h") of the fourth and fifth levels in sequence.

Thereby, it is possible to make a variation in the vehicle speed occurring until switching is carried out to the newly acquired speed limit value 612 gentler.

<4. Summary of Second Embodiment>

As can be seen from the above description, according to the second embodiment, in the vehicle speed limiting apparatus where the driving force of the vehicle is limited based on the speed limit value that is set for the road where the vehicle is travelling, it is determined whether the vehicle is in a state where the driving force of the vehicle is limited, and if it is determined that the vehicle is in a state where the driving force of the vehicle is limited, switching of the speed limit value is carried out in a plurality of levels (if the speed limit value of the road changes).

Thereby, it is possible to make a variation in the vehicle speed occurring due to switching of the speed limit value gentler. Thus, it is possible to reduce occurrence of a feeling of the driver of the vehicle that something is wrong when a variation occurs in the vehicle speed due to switching of the speed limit value.

Third Embodiment

According to the second embodiment described above, in order to make a variation in the vehicle speed occurring due to switching of the speed limit value gentler, switching of the speed limit value is carried out in a plurality of levels. According to the third embodiment, a variation in the vehicle speed is made gentler by an increase in the time constant used when controlling the power train by the power train control device. Below, the third embodiment will be described in detail. The description will be made focusing on the differences from the second embodiment.

<1. Functional Configuration of Vehicle Speed Limiting ECU>

Figure 14:
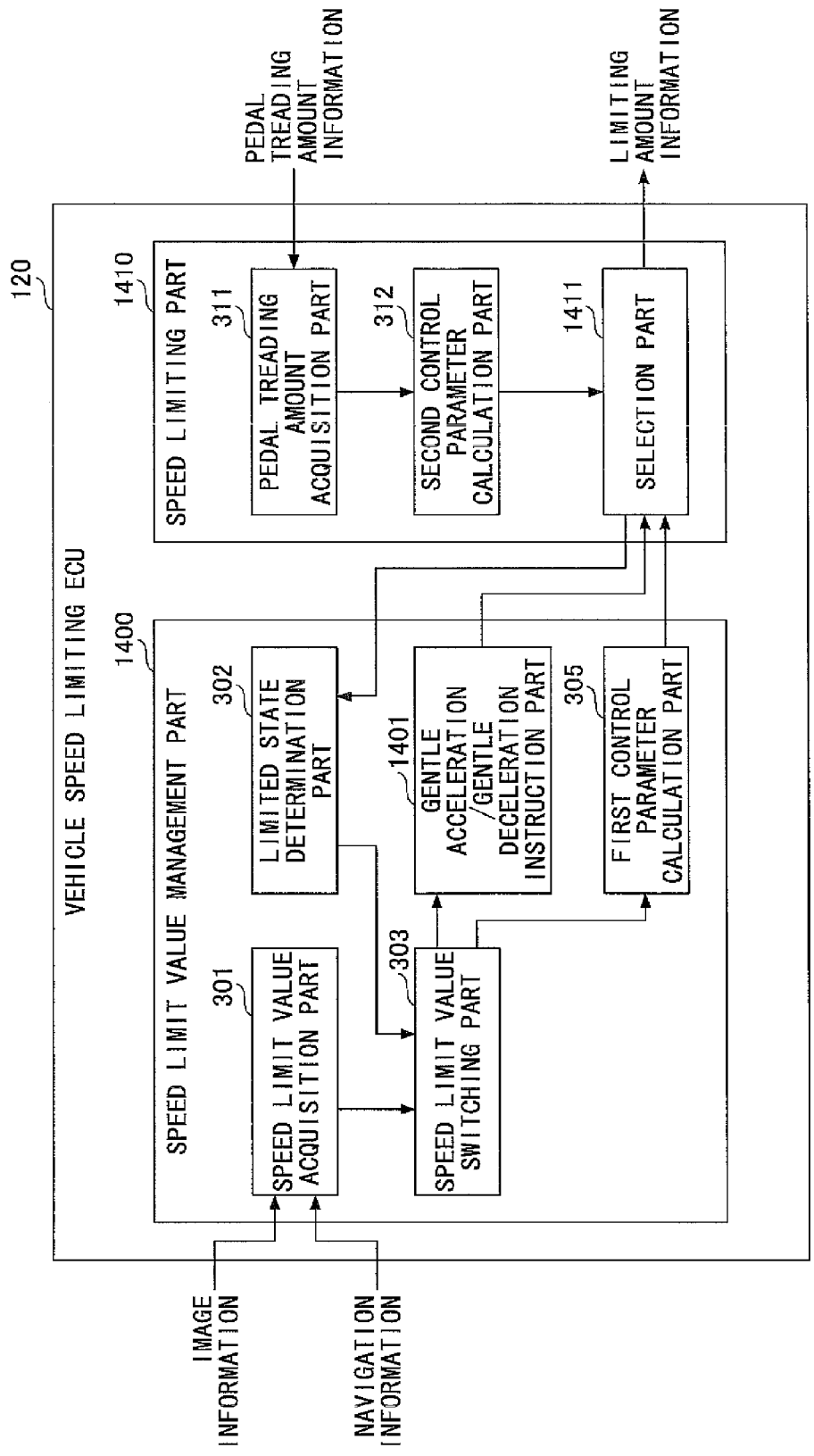
FIG. 14 illustrates one example of a functional configuration of the vehicle speed limiting ECU.

First, the functional configuration of the vehicle speed limiting ECU 120 according to the third embodiment will be described. FIG. 14 illustrates the functional configuration of the vehicle speed limiting ECU 120.

What is different from FIG. 10 is that the speed limit value management part 1400 has a gentle acceleration/gentle deceleration instruction part 1401 instead of the speed limit value multi-level switching part 1001, and the function of the selection part 1411 of the speed limiting part 1410 is different from the function of the selection part 313 of FIG. 10.

The gentle acceleration/gentle deceleration instruction part 1401 sends a gentle acceleration instruction or a gentle deceleration instruction to the selection part 1411 if switching to the newly acquired speed limit value is to be carried out when the vehicle is in a "being limited" state.

After receiving the gentle acceleration instruction or the gentle deceleration instruction from the gentle acceleration/ gentle deceleration instruction part 1401, the selection part 1411 transmits the gentle acceleration instruction or the gentle deceleration instruction to the power train control device 142 accordingly.

As a result, the power train control device 142 increases the time constant used when controlling the power train. As a result, it is possible to make a variation in the vehicle speed occurring when the power train is controlled based on the first control parameter gentler.

In other words, it is possible to make a variation in the vehicle speed occurring due to switching of the speed limit value gentler, and it is possible to avoid such a variation in the vehicle speed as to give a feeling that something is wrong to the driver. As a result, it is possible to reduce occurrence of the driver's feeling that something is wrong when the vehicle speed varies due to switching of the speed limit value.

<2. Speed Limit Value Management Process by Speed Limit Value Management Part>

Figure 15:
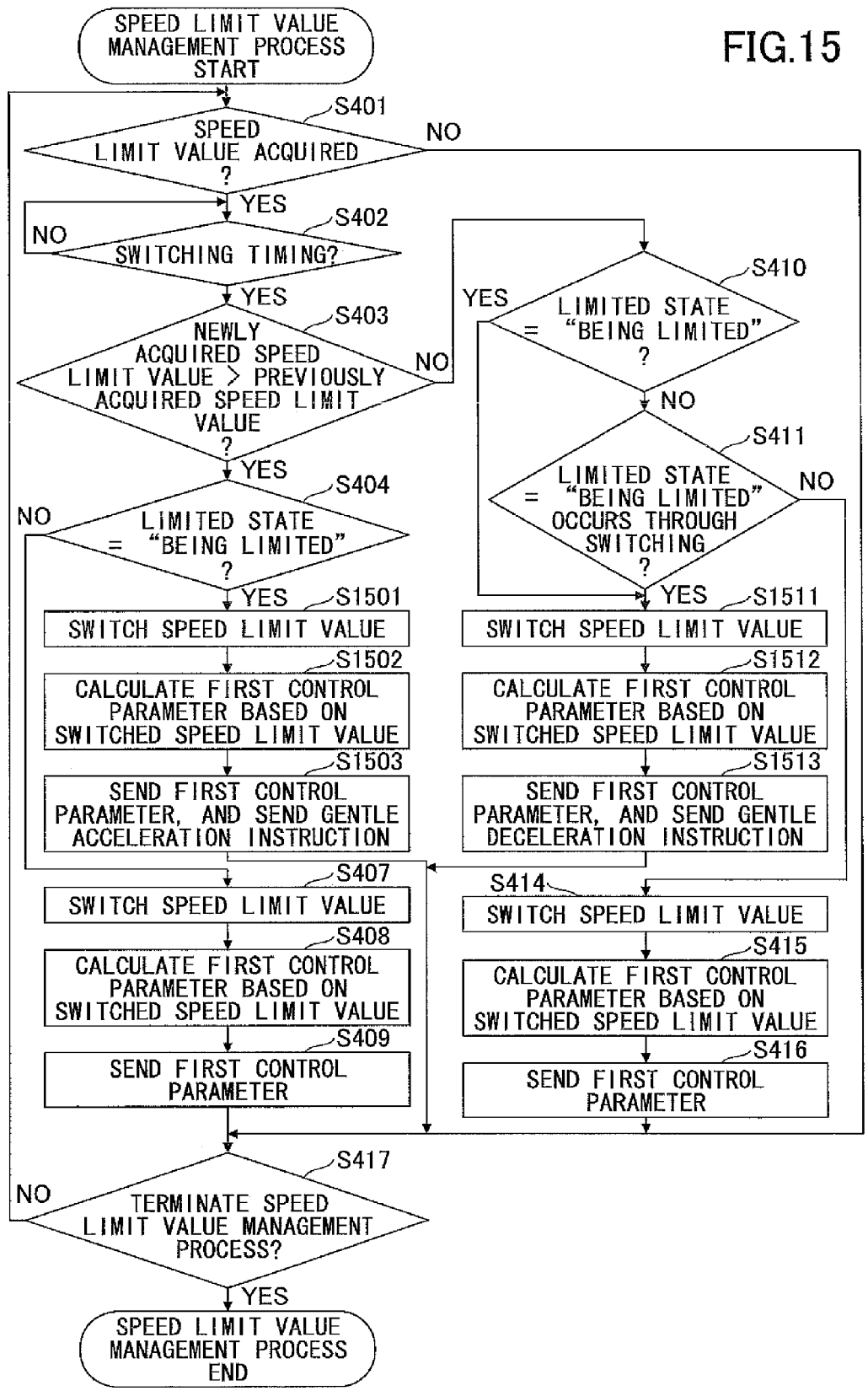
FIG. 15 is a flowchart illustrating one example of the speed limit value management process.

Next, a flow of the speed limit value management process carried out by the speed limit value management part 1400 will be described. FIG. 15 is a flowchart of the speed limit value management process carried out by the speed limit value management part 1400. What is different from the flowchart of the speed limit value management process shown in FIG. 11 is steps S1501-S1503 and steps S1511-S1513.

In step S1501, the speed limit value switching part 303 carries out switching to the newly acquired speed limit value, and sends the speed limit value, to which the switching has been thus carried out, to the first control parameter calculation part 305.

In step S1502, the first control parameter calculation part 305 calculates the first control parameter based on the speed limit value, to which the switching has been thus carried out. In step S1503, the first control parameter calculation part 305 sends the calculated first control parameter to the selection part 1411, and sends the gentle acceleration instruction to the selection part 1411.

In the same way, in step S1511, the speed limit value switching part 303 carries out switching to the newly acquired speed limit value, and sends the speed limit value, to which the switching has been thus carried out, to the first control parameter calculation part 305.

In step S1512, the first control parameter calculation part 305 calculates the first control parameter based on the speed limit value, to which the switching has been thus carried out. In step S1513, the first control parameter calculation part 305 sends the calculated first control parameter to the selection part 1411, and sends the gentle deceleration instruction to the selection part 1411.

<3. Actual Examples>

Figure 16A:
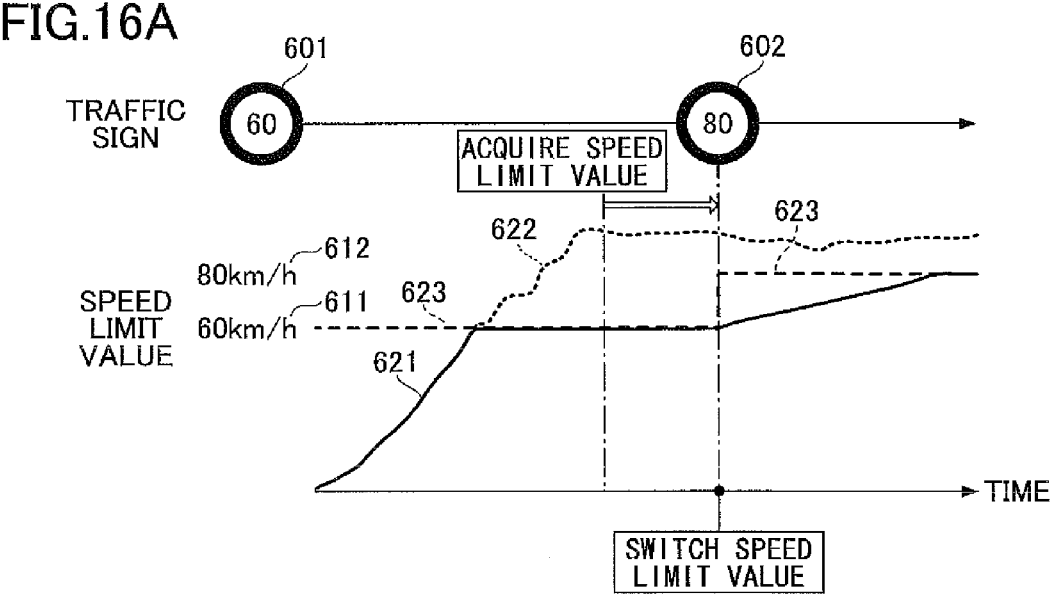
FIGS. 16A and 16B illustrate actual examples of the speed limit value management process and the speed limiting process.
Figure 16B:
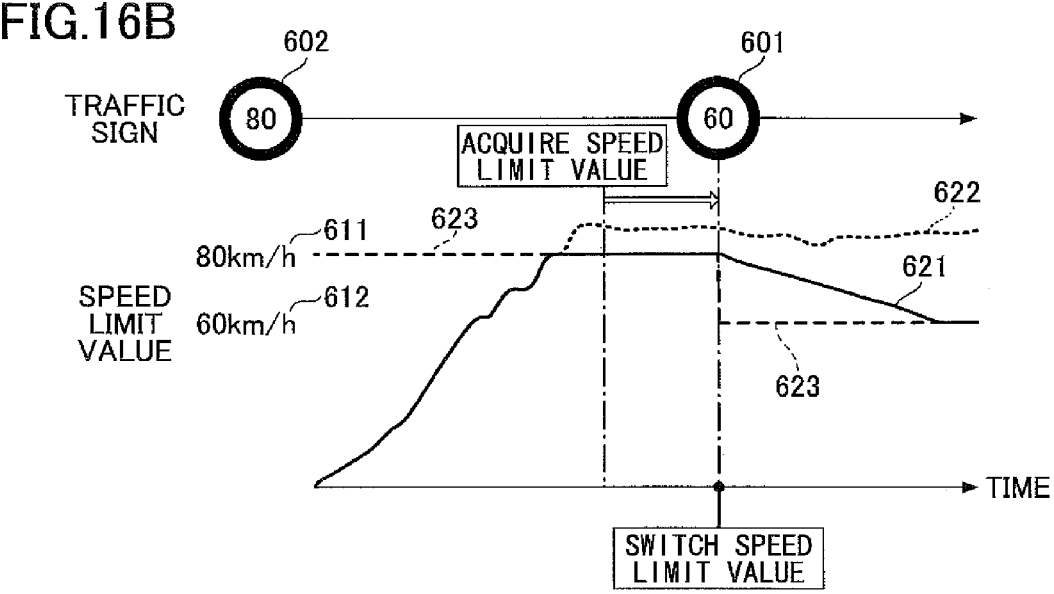

Next, actual examples of the speed limit value management process and the speed limiting process will be described. FIGS. 16A and 16B illustrate actual examples of the speed limit value management process and the speed limiting process. FIG. 16A illustrates a case where the speed limit value greater than the current speed limit value is newly acquired. FIG. 16B illustrates a case where the speed limit value less than the current speed limit value is newly acquired.

As shown in FIG. 16A, it is assumed that the speed limit value acquisition part 301 newly acquires "80 km/h" as the speed limit value 612 based on a traffic sign 602. In this case, when the vehicle passes through the position where the traffic sign 602 is installed, switching is carried out to the newly acquired speed limit value 612 (see the broken line 623).

At this time, the gentle acceleration/gentle deceleration instruction part 1401 transmits the gentle acceleration instruction to the selection part 1411 which then transmits the gentle acceleration instruction to the power train control device 142. Thereby, the power train control device 142 increases the time constant used when controlling the power train. As a result, the current vehicle speed 621 increases gently.

In the same way, as shown in FIG. 16B, it is assumed that the speed limit value acquisition part 301 newly acquires "60 km/h" based on a traffic sign 602 as the speed limit value 612. In this case, when the vehicle passes through the position where the traffic sign 601 is installed, switching is carried out to the newly acquired speed limit value 612 (see the broken line 623).

At this time, the gentle acceleration/gentle deceleration instruction part 1401 transmits the gentle deceleration instruction to the selection part 1411 which then transmits the gentle deceleration instruction to the power train control device 142. Thereby, the power train control device 142 increases the time constant used when controlling the power train. As a result, the current vehicle speed 621 gently falls.

<4. Summary of Third Embodiment>

As can be seen from the above description, according to the third embodiment, in the vehicle speed limiting apparatus where the driving force of the vehicle is limited based on the speed limit value that is set for the road where the vehicle is travelling, it is determined whether the vehicle is in a state where the driving force of the vehicle is limited, and if it is determined that the vehicle is in a state where the driving force of the vehicle is limited, the time constant used when controlling the power train is increased (if the speed limit value of the road changes).

Thereby, it is possible to make a variation in the vehicle speed occurring due to switching of the speed limit value gentler. Thus, it is possible to reduce occurrence of a feeling of the driver of the vehicle that something is wrong when a variation in the vehicle speed occurs due to switching of the speed limit value.

Fourth Embodiment

In the first embodiment described above, it is determined whether the vehicle is in a "being limited" state in both of a case where the speed limit value greater than the current speed limit value is newly acquired and a case where the speed limit value less than the current speed limit value is newly acquired.

According to the fourth embodiment, it is determined whether the vehicle is in a "being limited" state only in a case where the speed limit value greater than the current speed limit value is newly acquired. If it is then determined that the vehicle is in a "being limited" state, the switching screen page is displayed.

For the sake of more clearly describing an object of the fourth embodiment, the following control scheme of the vehicle speed control ECU 120 is assumed. That is, if the speed limit value greater than the current speed limit value is acquired, sudden acceleration may occur depending on the pedal treading amount at a time when the speed limit value is switched. That is, in a case where the speed limit value greater than the current speed limit value is acquired, the variation in the vehicle speed occurring due to the switching to the newly acquired speed limit value depends on the pedal treading amount at a time of switching the speed limit value. For example, the greater the pedal treading amount becomes, the more steeply the vehicle speed increases. In contrast thereto, in a case where the speed limit value less than the current speed limit value is acquired, the variation in the vehicle speed occurring due to the switching to the newly acquired speed limit value does not depend on the pedal treading amount at a time of switching the speed limit value. In other words, the control scheme can be such as to implement gentle deceleration in a case where the speed limit value less than the current speed limit value is acquired regardless of whether the vehicle is in a "being limited" state.

Therefore, according to the fourth embodiment, the switching screen page is displayed only if the speed limit value greater than the current speed limit value is acquired when the vehicle is in a "being limited" state. Below, the fourth embodiment will be described. The description will be made focusing on the differences from the first embodiment.

FIG. 17 is a flowchart of the speed limit value management process according to the fourth embodiment. What is different from FIG. 4 is step S1701. In step S1701, the speed limit value switching part 303 compares the speed limit value newly acquired in step S401 and the previously acquired speed limit value.

If the newly acquired speed limit value is greater than the previously acquired speed limit value (in other words, if the switching is to increase the speed limit value) as a result of the comparison, the process proceeds to step S404. Because the process starting from step S404 has been already described using FIG. 4, the duplicate description will be omitted.

In step S1701, if the newly acquired speed limit value is less than or equal to the previously acquired speed limit value (in other words, if the switching is to lower the speed limit value), the process proceeds to step S407. Thereby, the speed limit value switching part 303 carries out switching to the newly acquired speed limit value. In other words, if switching is to lower the speed limit value, switching is automatically carried out without displaying the switching screen page.

<Summary of Fourth Embodiment>

As can be seen from the above description, according to the fourth embodiment, in the vehicle speed limiting apparatus where the driving force of the vehicle is limited based on the speed limit value that is set for the road where the vehicle is travelling, it is determined whether the vehicle is in a state where the driving force of the vehicle is limited, if it is determined that the vehicle is in a state where the driving force of the vehicle is limited, and the speed limit value greater than the current speed limit value is acquired, the switching screen page is displayed to switch the speed limit value, and under the condition that the driver performs an allowance operation allowing the switching in response to the switching screen page being displayed, the switching of the speed limit value to the greater value is actually carried out.

Thereby, it is possible to acquire the same advantageous effects as those of the first embodiment.

Fifth Embodiment

In the first through fourth embodiments described above, an operation of pressing the "Yes" button 631 in the switching screen page is cited as one example of the allowance operation performed by the driver of the vehicle. However, the allowance operation performed by the driver of the vehicle is not limited to an operation of pressing the "Yes" button 631 in the switching screen page. For example, it is also possible to use an operation of treading (pressing) on the accelerator pedal (or returning the once trodden (pressed) accelerator pedal) as the allowance operation. Below, the corresponding fifth embodiment will be described. The description will be made focusing on the differences from the first embodiment.

<1. Functional Configuration of Vehicle Speed Limiting ECU>

Figure 18:
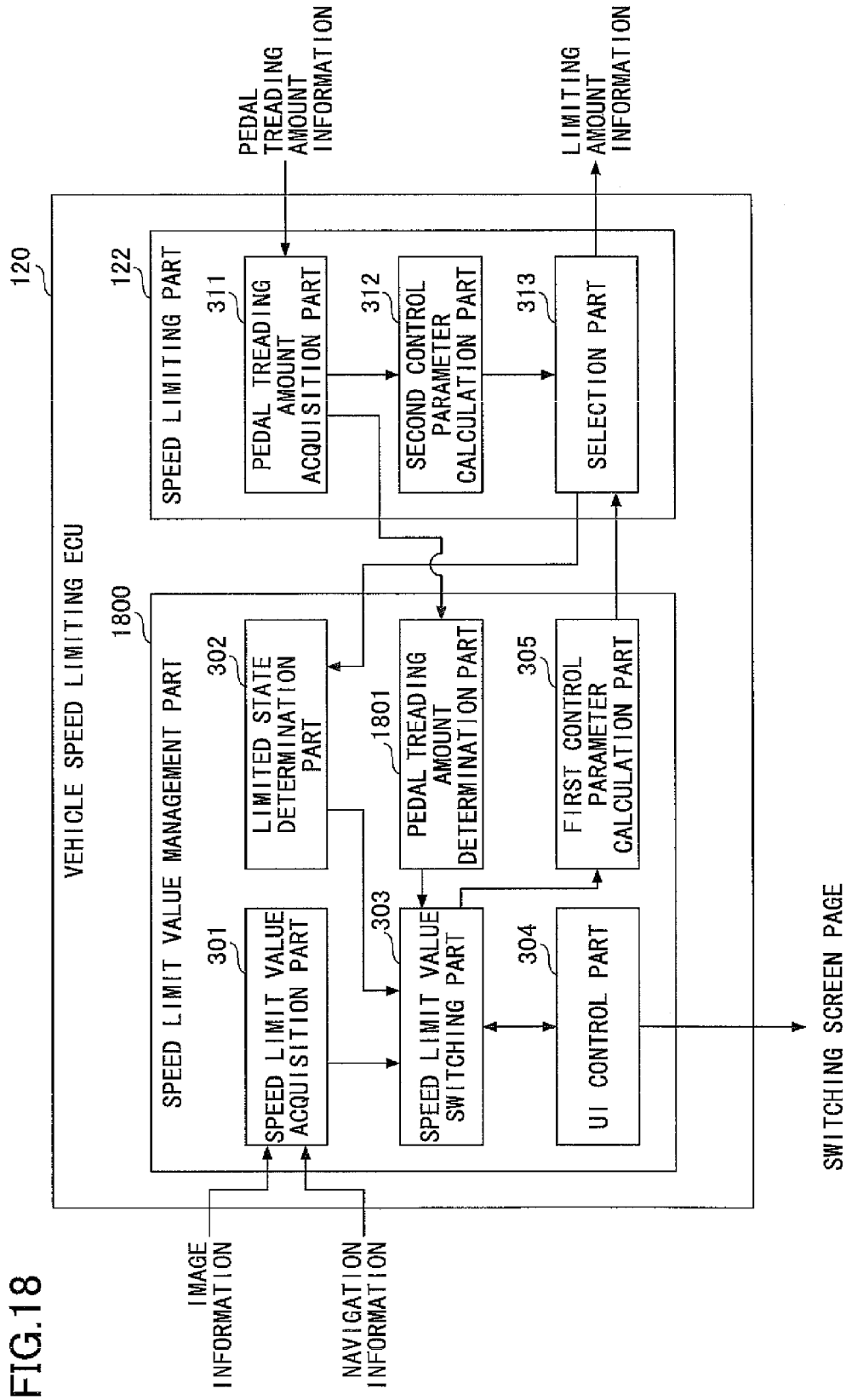
FIG. 18 illustrates one example of a functional configuration of the vehicle speed limiting ECU.

First, the functional configuration of the vehicle speed limiting ECU 120 according to the fifth embodiment will be described. FIG. 18 illustrates one example of the functional configuration of the vehicle speed limiting ECU 120.

What is different from FIG. 3 is that the speed limit value management part 1800 has a pedal treading amount determination part 1801. The pedal treading amount determination part 1801 monitors the pedal treading amount information acquired by the pedal treading amount acquisition part 311 when the UI control part 304 displays the switching screen page. If the pedal treading amount has a change, the pedal treading amount determination part 1801 determines that the driver has performed the allowance operation.

<2. Actual Examples>

FIGS. 19A-20B illustrate the allowance operation performed by the driver when the switching screen page 1911 is displayed. As shown in FIGS. 19A and 19B, when the vehicle approaches the position where a traffic sign 602 is installed, the UI control part 304 displays the switching screen page 1911 including the newly acquired speed limit value 612 on the display device 130. The switching screen page 1911 includes "80 km/h" as the newly acquired speed limit value 612, but does not includes the "Yes" button 631 and the "No" button 632.

In response to the switching screen page 1911 being thus displayed, the pedal treading amount determination part 1801 monitors the pedal treading amount information (see the area 1901).

In the example of FIG. 19A, immediately after the switching screen page 1911 is displayed, the pedal treading amount increases (see the area 1901). Therefore, the pedal treading amount determination part 1801 determines that the driver has allowed the switching to the newly acquired speed limit value. In this case, when the vehicle passes through the position where the traffic sign 602 is installed, the switching to the newly acquired speed limit value is carried out (see the broken line 623).

In the example of FIG. 19B, no change occurs in the pedal treading amount immediately after the switching screen page 1911 is displayed (see the area 1901). Therefore, the pedal treading amount determination part 1801 determines that the driver has not allowed the switching to the newly acquired speed limit value. In this case, even when the vehicle passes through the position where the traffic sign 602 is installed, the switching to the newly acquired speed limit value is not carried out (see the broken line 623).

In the same way, as shown in FIGS. 20A and 20B, when the vehicle approaches the position where a traffic sign 601 is installed, the UI control part 304 displays the switching screen page 1911 including the newly acquired speed limit value 612.

In response to the switching screen page 1911 being displayed, the pedal treading amount determination part 1801 monitors the pedal treading amount information (see the area 1901).

In the example of FIG. 20A, immediately after the switching screen page 1911 is displayed, the pedal treading amount falls (see the area 1901). Therefore, the pedal treading amount determination part 1801 determines that the driver has allowed the switching to the newly acquired speed limit value. In this case, when the vehicle passes through the position where the traffic sign 601 is installed, the switching to the newly acquired speed limit value is carried out (see the broken line 623).

In the example of FIG. 20B, no change occurs in the pedal treading amount immediately after the switching screen page 1911 is displayed (see the area 1901). Therefore, the pedal treading amount determination part 1801 determines that the driver has not allowed the switching to the newly acquired speed limit value. In this case, even when the vehicle passes through the position where the traffic sign 601 is installed, the switching to the newly acquired speed limit value is not carried out (see the broken line 623).

<3. Summary of Fifth Embodiment>

As can be seen from the above description, according to the fifth embodiment, in the vehicle speed limiting apparatus where the driving force of the vehicle is limited based on the speed limit value that is set for the road where the vehicle is travelling, it is determined whether the vehicle is in a state where the driving force of the vehicle is limited, if it is determined that the vehicle is in a state where the driving force of the vehicle is limited, the switching screen page is displayed to switch the speed limit value (if the speed limit value of the road changes), and the pedal treading amount is monitored in response to the switching screen page being displayed, and it is determined that driver has performed an allowance operation to allow the switching when it is determined that the pedal treading amount has changed.

Thereby, the driver can perform the allowance operation only by performing an operation of the accelerator pedal to switch the speed limit value.

Other Embodiments

In the first embodiment described above, the switching screen page is displayed when the distance to the position where a traffic sign is installed becomes less than or equal to a predetermined distance. However, the actual timing to display the switching screen page is not limited thereto. For example, an embodiment can be such as to display the switching screen page at a time when the speed limit value is newly acquired.

In the first embodiment described above, switching to the newly acquired speed limit value is carried out at a timing when the vehicle passes through a traffic sign. However, the actual timing to carry out switching to the newly acquired speed limit value is not limited thereto. For example, an embodiment can be such as to carry out the switching at a timing when the allowance operation is performed if the allowance operation is carried out after the vehicle passes through the traffic sign.

In the first embodiment described above, it is determined that the driver has not allowed the switching to the newly acquired speed limit value if the "No" button in the switching screen page is pressed. However, an actual method of determining that the driver has not allowed switching is not limited thereto. For example, an embodiment can be such as to determine that the driver has not allowed switching if no operation is performed by the driver on the switching screen page within a predetermined time period from when the switching screen page is displayed.

In the second embodiment described above, the difference between the speed limit value before being switched and the newly acquired speed limit value is divided into respective divisions at five levels. However, the number of levels of the divisions is not limited to five. Also, according to the second embodiment, when the vehicle will enter a "being limited" state as a result of switching to the newly acquired speed limit value, the difference between the current vehicle speed and the newly acquired speed limit value is divided into respective divisions at four levels reduced from the above-mentioned five levels. However, an embodiment can be such that the number of levels of the divisions is not reduced even when the difference between the current vehicle speed and the newly acquired speed limit value is divided.

In the second and third embodiments described above, the speed limit value multi-level switching part 1001 or the gentle acceleration/gentle deceleration instruction part 1401 is included instead of the UI control part 304. However, an embodiment can be such that the speed limit value management part includes both the UI control part 304 and the speed limit value multi-level switching part 1001 or the gentle acceleration/gentle deceleration instruction part 1401. In other words, an embodiment can be such that, upon switching of the speed limit value, both displaying the switching screen page to receive the driver's allowance operation and implementing gradual or gentle variation in the vehicle speed can be carried out.

Actually, for example, steps S405 and S406 of FIG. 4 can be inserted between steps S404 and S1101 in FIG. 11, and, in the same way, steps S412 and S413 of FIG. 4 can inserted immediately before step S1111 in FIG. 11. Thereby, when the vehicle is in a "being limited" state (YES in step S404), the switching screen page is displayed (step S405). Then, if the driver allows the switching on the switching screen page (YES in step S406), step S1101 is carried out for implementing gradual acceleration. If the driver does not allow the switching (NO in step S406), the process directly proceeds to step S417. In the same way, when the vehicle is in a "being limited" state (YES in step S410) or if the vehicle will enter a "being limited" state due to the switching (YES in step S411) even when the vehicle is not in a "being limited" state (NO in step S410), the switching screen page is displayed (step S412). Then, if the driver allows the switching on the switching screen page (YES in step S413), step S1111 is carried out for implementing gradual deceleration. If the driver does not allow the switching (NO in step S413), the process directly proceeds to step S417.

In the same way, steps S405 and S406 of FIG. 4 can be inserted between steps S404 and S1501 in FIG. 15, and, in the same way, steps S412 and S413 of FIG. 4 can be inserted immediately before step S1511 in FIG. 15. Thereby, when the vehicle is in a "being limited" state (YES in step S404), the switching screen page is displayed (step S405). Then, if the driver allows the switching on the switching screen page (YES in step S406), the process starting from step S1501 is carried out for implementing gentle acceleration. If the driver does not allow the switching (NO in step S406), the process directly proceeds to step S417. In the same way, when the vehicle is in a "being limited" state (YES in step S410) or if the vehicle will enter a "being limited" state due to the switching (YES in step S411) even when the vehicle is not in a "being limited" state (NO in step S410), the switching screen page is displayed (step S412). Then, if the driver allows the switching on the switching screen page (YES in step S413), the process starting from step S1511 is carried out for implementing gentle deceleration. If the driver does not allow the switching (NO in step S413), the process directly proceeds to step S417.

In the fifth embodiment described above, both the UI control part 304 and the pedal treading amount determination part 1801 are included. However, an embodiment can be such that the pedal treading amount determination part 1801 is included instead of the UI control part 304. In other words, an embodiment can be such that even when the vehicle approaches a traffic sign, the vehicle does not display the switching screen page, and the vehicle determines that the driver allows switching the speed limit value and switches the speed limit value when the driver operates the accelerator pedal.

Thus, the vehicle speed limiting apparatuses have been described in the embodiments. However, the present disclosure is not limited to these embodiments. Various modifications and/or improvements such as combinations with another element(s), or the like, can be made depending on actual application modes.

What is claimed is:

1. A vehicle speed limiting system that controls a vehicle, the system comprising one or more processors configured to:
   acquire a speed limit value that is set for a road where the vehicle is travelling;
   limit a driving force of the vehicle against an operation of an occupant of the vehicle, based on the acquired speed limit value, so that the vehicle will not exceed the acquired speed limit value even when the occupant of the vehicle requests a driving force that would cause the vehicle to exceed the acquired speed limit value;
   determine whether the vehicle is in a state where the driving force is being limited against the operation of the occupant of the vehicle;
   display a switching screen page enabling an occupant of the vehicle to input a switching instruction to switch the speed limit value used to limit the driving force when (i) a new speed limit value, different from a current speed limit value that was previously acquired, is acquired and (ii) it is determined that the vehicle is in the state where the driving force is being limited against the operation of the occupant of the vehicle; and
   switch the speed limit value that is used to limit the driving force to the new speed limit value when the occupant of the vehicle inputs the switching instruction in response to the display of the switching screen page.

2. The vehicle speed limiting system as claimed in claim 1, wherein the one or more processors are configured to:
   display the switching screen page, even when it is determined that the vehicle is not in the state where the driving force is being limited against the operation of the occupant of the vehicle, when it is determined that switching the speed limit value used to limit the driving force to the new speed limit value will cause the vehicle to enter the state where the driving force is being limited against the operation of the occupant of the vehicle.

3. The vehicle speed limiting system as claimed in claim 1, wherein the one or more processors are configured to:
   determine whether the switching instruction has been input based on an operation of an accelerator pedal of the vehicle.

4. The vehicle speed limiting system as claimed in claim 1, wherein the one or more processors are configured to:
   switch the speed limit value upon receipt of the switching instruction by calculating a plurality of intermediate speed limit values between the current speed limit value and the new speed limit value, and
   gradually change the limit of the driving force based on the plurality of intermediate speed limit values while changing from the current speed limit value to the new speed limit value.

5. The vehicle speed limiting system as claimed in claim 1, wherein the one or more processors are configured to:
   send an instruction that increases a time constant used to limit the driving force, when the occupant inputs the switching instruction, and
   the increase of the time constant causes a more gentle change in the limit of the driving force compared to the time constant that has not been increased.

6. A vehicle speed limiting system that controls a vehicle, the system comprising one or more processors configured to:
   acquire a speed limit value that is set for a road where the vehicle is travelling;
   limit a driving force of the vehicle against an operation of an occupant of the vehicle, based on the acquired speed limit value, so that the vehicle will not exceed the acquired speed limit value even when the occupant of the vehicle requests a driving force that would cause the vehicle to exceed the acquired speed limit value;
   determine whether the vehicle is in a state where the driving force is being limited against the operation of the occupant of the vehicle; and
   calculate a plurality of intermediate speed limit values between a current speed limit value currently used to limit the driving force and a new speed limit value, different from the current speed limit value that was previously acquired, when (i) the new speed limit value is acquired and (ii) it is determined that the vehicle is in the state where the driving force is being limited against the operation of the occupant of the vehicle,
   wherein
   the limit of the driving force is gradually changed based on the plurality of intermediate speed limit values while changing from the current speed limit value to the new speed limit value.

7. The vehicle speed limiting system as claimed in claim 6, wherein the one or more processors are configured to:
   calculate the plurality of intermediate speed limit values, even when it is determined that the vehicle is not in the state where the driving force is being limited against the operation of the occupant of the vehicle, when it is determined that switching the speed limit value used to limit the driving force to the new speed limit value will cause the vehicle to enter the state where the driving force is being limited against the operation of the occupant of the vehicle.

8. A vehicle speed limiting system that controls a vehicle, the system comprising one or more processors configured to:
acquire a speed limit value that is set for a road where the vehicle is travelling;
limit a driving force of the vehicle against an operation of an occupant of the vehicle, based on the acquired speed limit value, so that the vehicle will not exceed the acquired speed limit value even when the occupant of the vehicle requests a driving force that would cause the vehicle to exceed the acquired speed limit value;
determine whether the vehicle is in a state where the driving force is being limited against the operation of the occupant of the vehicle; and
send an instruction that increases a time constant used to limit the driving force when (i) a new speed limit value, different from a current speed limit value that was previously acquired, is acquired and (ii) it is determined that the vehicle is in the state where the driving force is being limited against the operation of the occupant of the vehicle,
wherein
the increase of the time constant causes a more gentle change in the limit of the driving force compared to the time constant that has not been increased.

9. The vehicle speed limiting system as claimed in claim 8, wherein the one or more processors are configured to:
send the instruction that increases the time constant, even when it is determined that the vehicle is not in the state where the driving force is being limited against the operation of the occupant of the vehicle, when it is determined that switching the speed limit value used to limit the driving force to the new speed limit value will cause the vehicle to enter the state where the driving force is being limited against the operation of the occupant of the vehicle.

* * * * *